(12) United States Patent
Saxena et al.

(10) Patent No.: US 6,602,057 B2
(45) Date of Patent: Aug. 5, 2003

(54) MANAGEMENT AND OPTIMIZATION OF LOAD SHARING BETWEEN MULTIPLE COMPRESSOR TRAINS FOR CONTROLLING A MAIN PROCESS GAS VARIABLE

(75) Inventors: Amit Saxena, Houston, TX (US); Michel LeDizes, Le Havre (FR)

(73) Assignee: Dresser-Rand Company, Olean, NY (US)

(*) Notice: Subject to any disclaimer, the term of this patent is extended or adjusted under 35 U.S.C. 154(b) by 2 days.

(21) Appl. No.: 09/968,249

(22) Filed: Oct. 1, 2001

(65) Prior Publication Data

US 2003/0063981 A1 Apr. 3, 2003

(51) Int. Cl.$^7$ .................................................. F04B 49/00
(52) U.S. Cl. ......................................... 417/286; 417/293
(58) Field of Search ................................. 417/286, 293, 417/62

(56) References Cited

U.S. PATENT DOCUMENTS

| | | |
|---|---|---|
| 3,648,479 A | 3/1972 | Richardson |
| 3,774,092 A | 11/1973 | Messervey, et al. |
| 4,152,902 A | 5/1979 | Lush |
| 4,248,054 A | 2/1981 | Watson et al. |
| 4,255,089 A | 3/1981 | Phillips et al. |
| 4,494,006 A * | 1/1985 | Staroselsky et al. ............ 417/5 |
| 4,640,665 A | 2/1987 | Staroselsky et al. ........ 417/286 |
| 4,807,150 A | 2/1989 | Hobbs |
| 5,108,263 A | 4/1992 | Blotenberg |
| 5,231,846 A | 8/1993 | Goshaw et al. |
| 5,259,731 A | 11/1993 | Dhindsa et al. |
| 5,347,467 A | 9/1994 | Staroselsky et al. ............ 417/5 |
| 5,508,943 A | 4/1996 | Batson et al. .................. 415/1 |
| 5,743,714 A | 4/1998 | Drob ............................. 417/2 |
| 5,743,715 A | 4/1998 | Staroselsky et al. ............ 417/2 |
| 5,752,378 A | 5/1998 | Mirsky et al. |
| 5,798,941 A | 8/1998 | McLeister |
| 5,908,462 A | 6/1999 | Batson |
| 6,142,740 A | 11/2000 | Connell |
| 6,217,288 B1 * | 4/2001 | Mirsky et al. ............... 417/282 |

* cited by examiner

Primary Examiner—Cheryl J. Tyler
(74) Attorney, Agent, or Firm—Haynes and Boone, LLP

(57) ABSTRACT

A control system is provided for load sharing between a plurality of compressors. The control system determines the actual coefficients of export flow for the compressors, compares the actual coefficients of export flow with a common or individual coefficients of export flow setpoints generated by one or more central controllers, and then generates control signals for adjusting the operating points of the compressors in order to load balance the compressors.

22 Claims, 21 Drawing Sheets

MANAGEMENT AND OPTIMIZATION OF LOAD SHARING BETWEEN MULTIPLE COMPRESSOR TRAINS FOR CONTROLLING A MAIN PROCESS GAS VARIABLE

BACKGROUND

This invention relates generally to control systems for controlling compressor trains, and in particular to control systems for load balancing compressor trains.

Conventional control systems for controlling multiple compressor trains use a station controller for controlling the main process gas variable that acts independently of the unit surge controllers. The station controller typically changes the compressor flows to match the process requirements. However, because the individual compressor trains are typically operationally inefficient due to the preset gains and biases of the station controller, the station controller is unable to dynamically change the preset gains and biases in response to load sharing setpoint changes caused by changing operating conditions. As a result, the station controller is typically unable to position the compressor trains for optimal load sharing. Furthermore, there is usually severe interaction between the surge controllers and the station controller when the export flow into the process drops below the minimum flow needed to keep a compressor on the surge control line. This interaction can cause dynamic process instabilities thereby making it impossible for the station controller to maintain the main process gas variable at a desired operating level.

Conventional approaches to overcoming the problems associated with conventional control systems for multiple compressor trains attempt to equalize the relative distances between the operating points of the compressors and their respective surge control lines in order to provide load sharing. However, these conventional approaches suffer from a number of serious drawbacks. For example, using the compressor operating point as the controlled variable suffers from a number of serious disadvantages. In particular, when the export flow into the process as determined by the station controller is less than the compressor flow, which typically occurs after the compressor operating point reaches the surge control line, the anti-surge recycle valve opens to maintain the compressor flow at the fixed minimum flow needed to avoid surge which results in the loss of the dynamic compressor flow signal to the unit load sharing controller. As a result, the unit load sharing controller is prevented from further decreasing the export flow into the process to allow for small variations in the speed of the unit or in the position of the suction throttle valve position thereby lefting the recycle flow increase in order to decrease the export flow into the process. Consequently, optimal load sharing is not provided and the failure of the load sharing system to meet the process export flow requirements results in a loss of control of the main process gas variable.

The present invention is directed to overcoming one or more of the limitations of existing control systems for load balancing compressor trains.

SUMMARY

According to an embodiment of the present invention, a method of controlling the operation of a first compressor having an inlet coupled to a suction line and an outlet coupled to a discharge line and a second compressor having an inlet coupled to the suction line and an outlet coupled to the discharge line is provided that includes determining an operating pressure within the suction line, determining a common coefficient of export flow set point for the first and second compressors as a function of the operating pressure within the suction line, and adjusting the operating points of the first and second compressors using the common coefficient of export flow set point.

According to another embodiment of the present invention, a method of controlling the operation of a first compressor having an inlet coupled to a suction line and an outlet and a second compressor having an inlet coupled to the outlet of the first compressor and an outlet coupled to a discharge line is provided that includes determining an operating pressure within the suction line, determining an operating pressure within the inlet to the second compressor, determining first and second coefficients of export flow set point for the first and second compressors as a function of the operating pressures within the suction line and the inlet to the second compressor, and adjusting the operating points of the first and second compressors using the first and second coefficients of export flow set points.

The present embodiments of the invention provide a number of advantages. For example, by operating each compressor with a sufficient margin from the surge line, safe operation of all of the compressors is ensured. Furthermore, the present embodiments maximize the efficiency of the process by minimizing recycle flows for each of the compressors. In addition, the present embodiments maintain the operating points of all of the compressors at the same margin from the surge control line. Furthermore, the present embodiments determine the coefficient of export flow setpoints as a function, in part, of the suction pressure. In addition, the present embodiments, decouple the surge and unit load sharing controllers thereby avoiding dynamic instabilities and ensuring smooth operation of the compressor trains under changing process conditions. Finally, the present embodiments, provide fully automatic operation and compressor load optimization by implementing an integrated load sharing methodology encompassing multiple compressor trains.

DESCRIPTION OF THE PREFERRED EMBODIMENTS

Figure 1A:
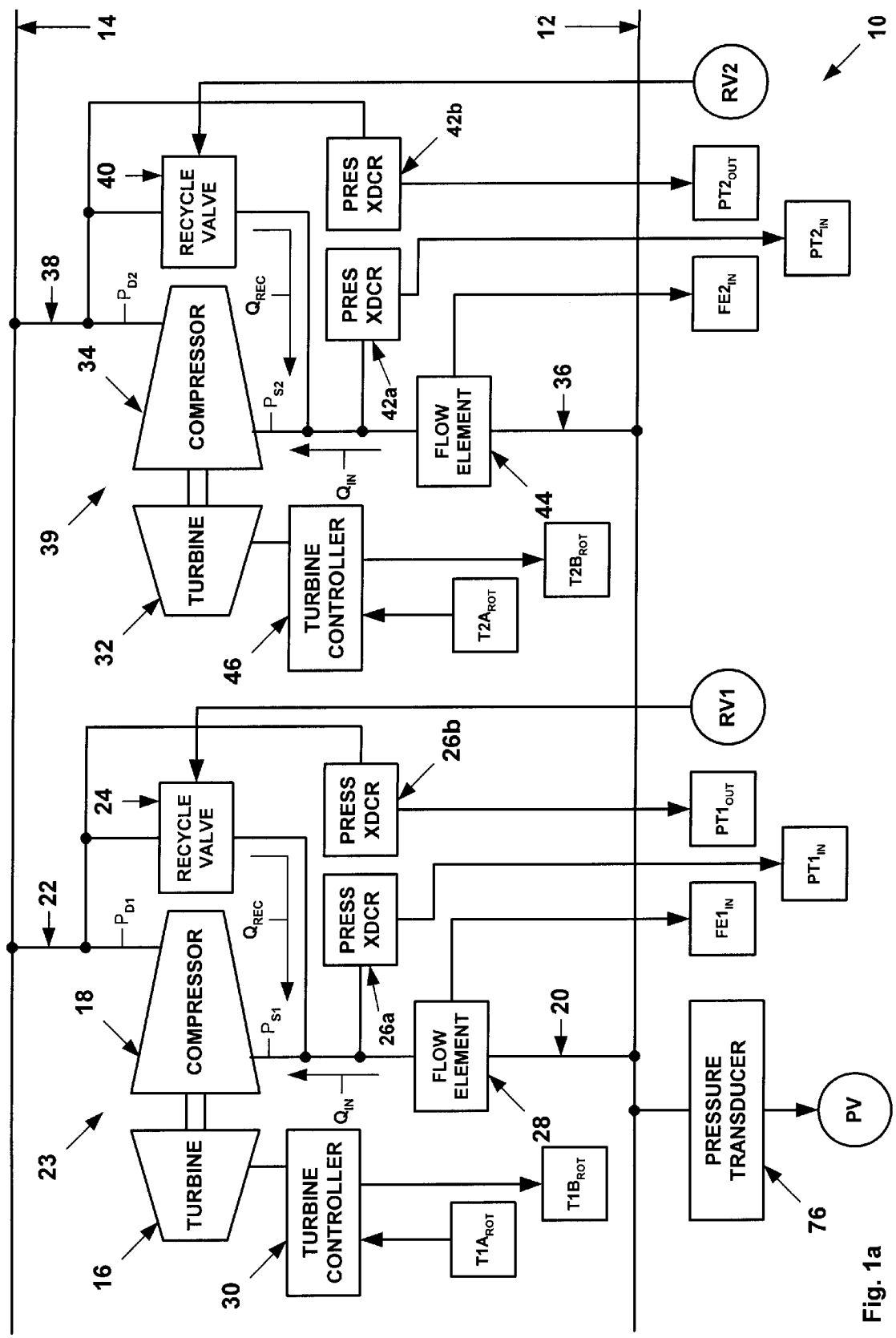
FIGS. 1a–1d are schematic illustrations of an exemplary embodiment of a control system for a plurality of compressors.
Figure 1B:
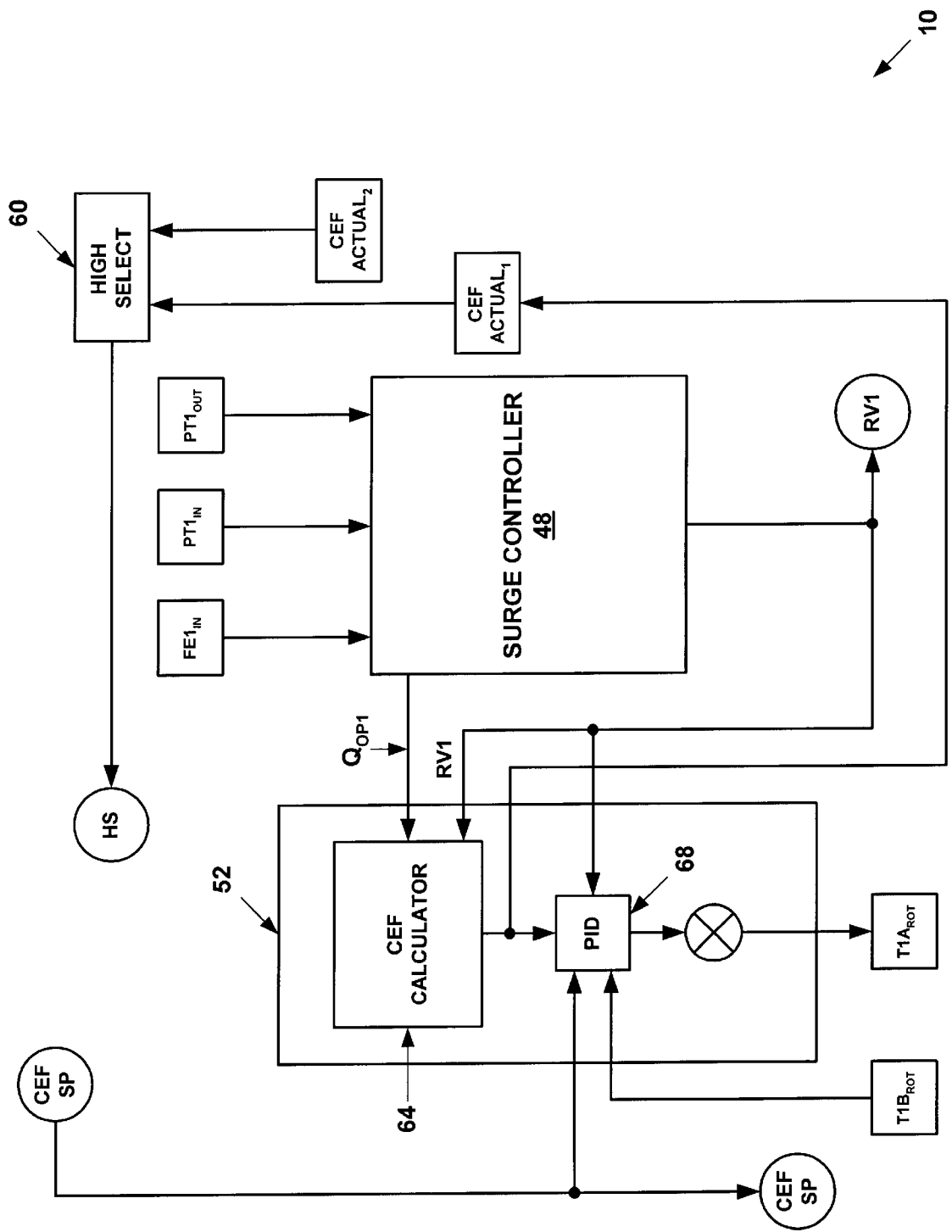
Figure 1C:
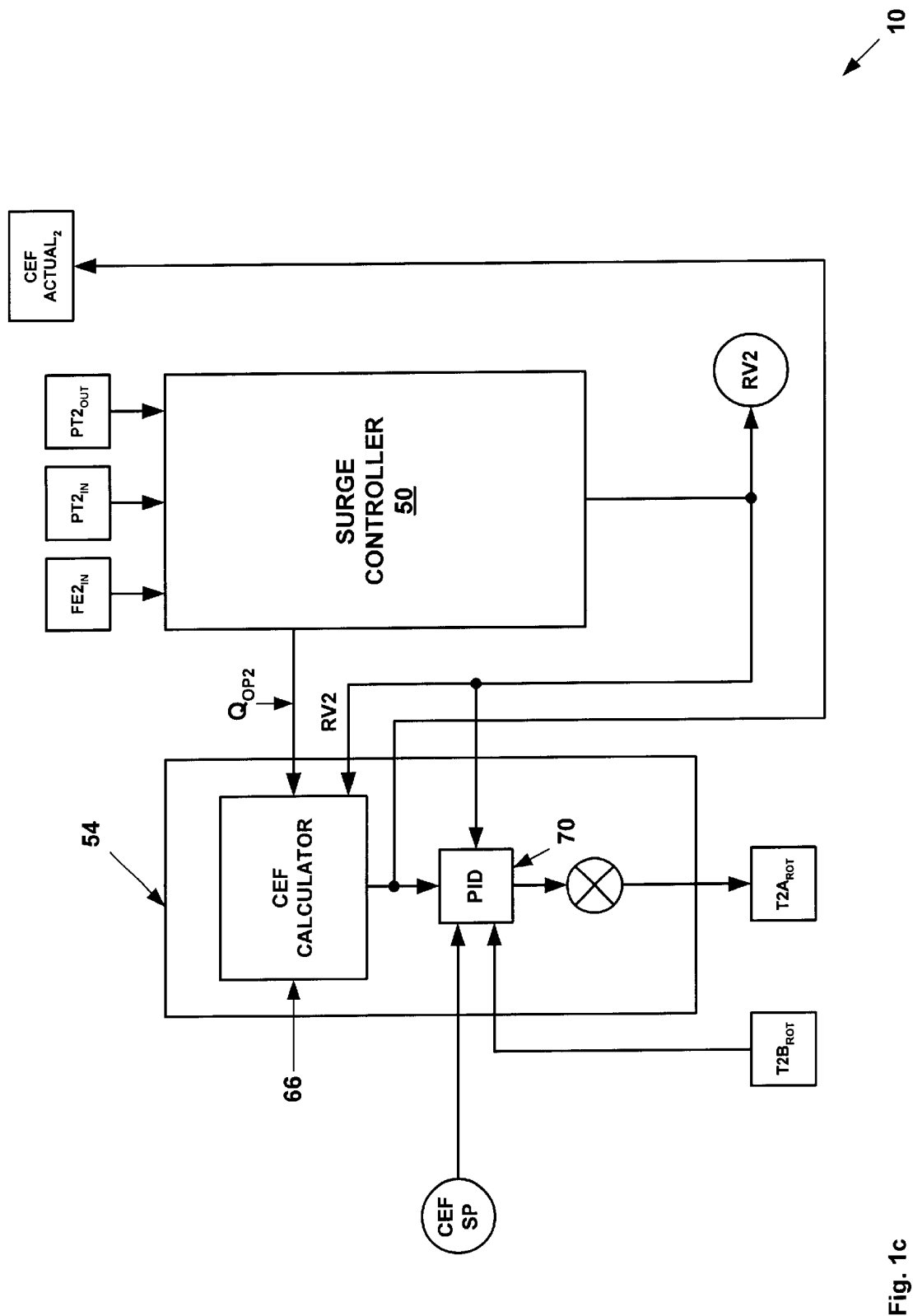
Figure 1D:
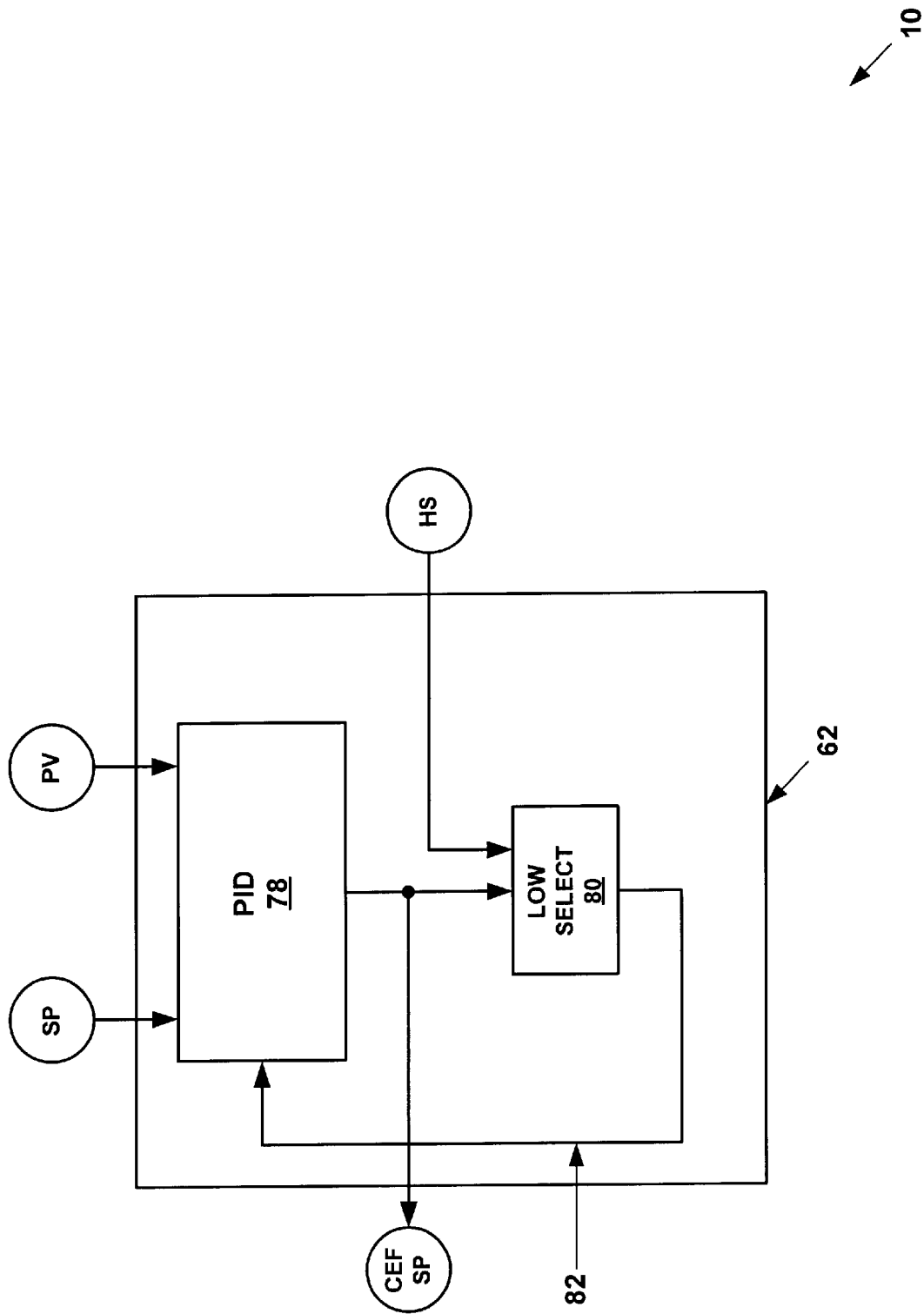

Referring to FIGS. 1a, 1b, 1c, and 1d, the reference numeral 10 refers, in general, to a control system for controlling a plurality of compressor trains that includes a suction line 12 and a discharge line 14. A first turbine 16 is operably coupled to a first compressor 18 having an input line 20 that is fluidicly coupled to the suction line 12 and an output line 22 that is fluidicly coupled to the discharge line 14. The first turbine 16 and the first compressor 18 together define a first compressor train 23. The output line 22 of the first compressor 18 may be controllably fluidicly coupled to the input line 20 of the first compressor by a first recycle valve 24. Pressure transducers, 26a and 26b, are fluidicly coupled to the input and output lines, 20 and 22, respectively, of the first compressor 18 and generate signals, $PT1_{IN}$ and $PT1_{OUT}$, respectively, that are representative of the operating pressures, $P_{S1}$ and $P_{D1}$, respectively, in the input and output lines, respectively, of the first compressor. A flow element 28 is fluidicly coupled to the input line 20 of the first compressor 18 and generates signals $FE1_{IN}$ that are representative of the flow rate in the input line. A first turbine controller 30 is operably coupled to the first turbine 16 that controls the operation of the first turbine and generates signals $T1B_{ROT}$ that are representative of the actual rotational speed of the first turbine.

A second turbine 32 is operably coupled to a second compressor 34 having an input line 36 that is fluidicly coupled to the suction line 12 and an output line 38 that is fluidicly coupled to the discharge line 14. The second turbine 32 and the second compressor 34 together define a second compressor train 39. The output line 38 of the second compressor 34 may be controllably fluidicly coupled to the input line 36 of the second compressor by a second recycle valve 40. Pressure transducers, 42a and 42b, are fluidicly coupled to the input and output lines, 36 and 38, respectively, of the second compressor 34 and generate signals, $PT2_{IN}$ and $PT2_{OUT}$, respectively, that are representative of the operating pressures, $P_{S2}$ and $P_{D2}$, respectively, in the input and output lines, respectively, of the second compressor. A flow element 44 is fluidicly coupled to the input line 36 of the second compressor 34 and generates signals $FE2_{IN}$ that are representative of the flow rate in the input line. A second turbine controller 46 is operably coupled to the second turbine 32 that controls the operation of the second turbine and generates signals $T2B_{ROT}$ that are representative of the actual rotational speed of the second turbine.

Figure 2:
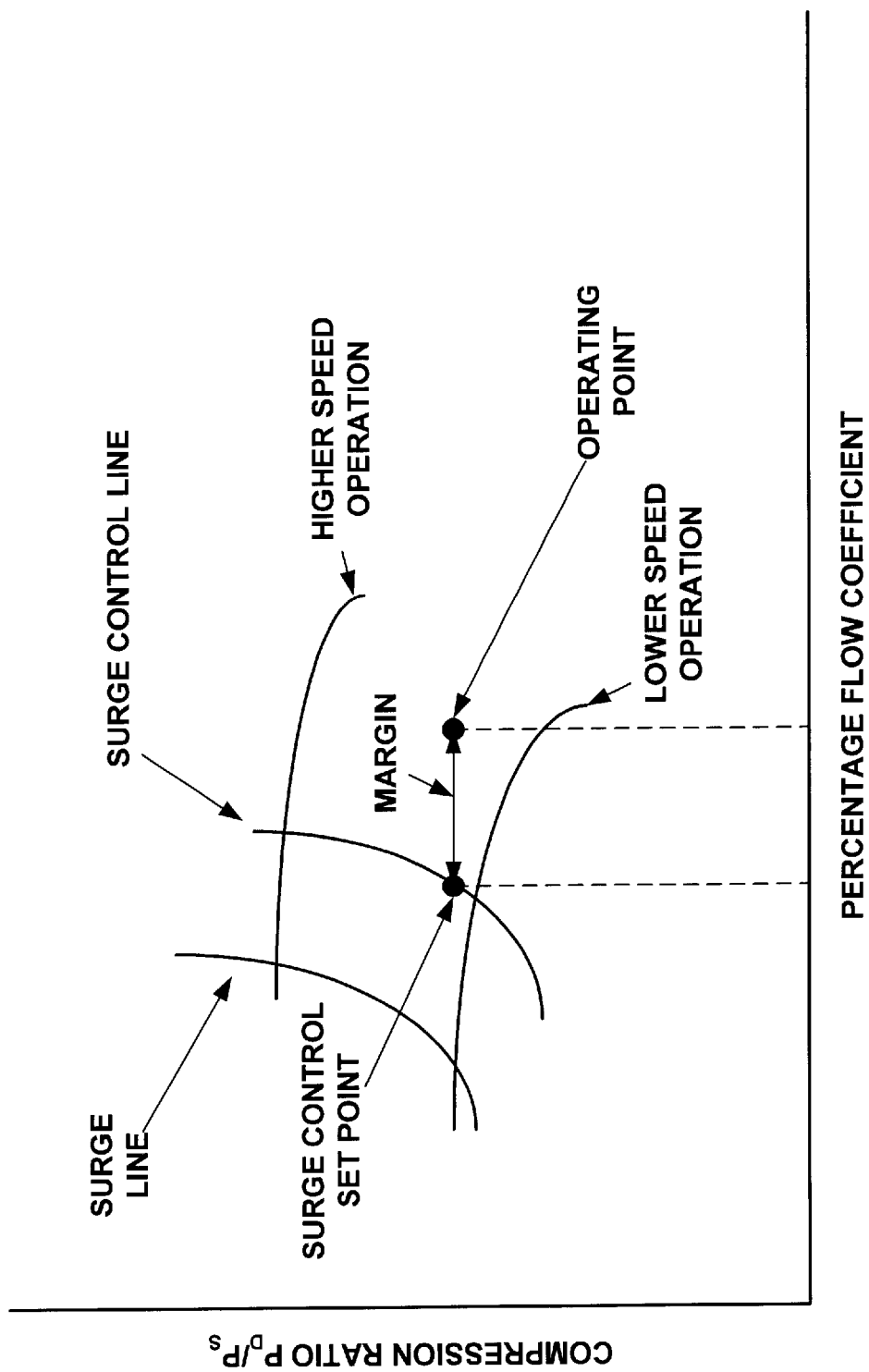
FIG. 2 is a graphical illustration of an exemplary embodiment of a compressor performance curve plotted in terms of the compression ratio versus the percentage flow coefficient for the control system of FIGS. 1a–1d.

Referring to FIG. 2, for any given operating speed, a surge control line defines when the corresponding recycle valves, 24 and/or 40, are opened to permit compressor recycle flow. Moreover, for any given compression ratio $P_D/P_S$, a surge control set point $Q_{SP}$ defines when the corresponding recycle valves, 24 and/or 40, are opened to permit compressor recycle flow. Furthermore, when the operating point of the compressors, 18 and/or 34, are to the right of or below the corresponding surge control line, the corresponding recycle valves, 24 and/or 40, will remain closed. The degree to which the operating point of the compressors, 18 and/or 34, are to the right of the corresponding surge control set point defines the operating margin. However, when the operating point of the compressors, 18 and/or 34, are to the left of or above the corresponding surge control line, the corresponding recycle valves, 24 and/or 40, are opened in order to avoid damaging surge conditions.

During operation, the coefficient of export flow (CEF) for each of the compressors, 18 and 34, is defined by the following relationship:

$$CEF = \frac{Q_{IN} - Q_{REC}}{Q_{SP}} \qquad (1)$$

where
CEF=coefficient of export flow;
$Q_{IN}$=compressor inlet flow;
$Q_{REC}$=compressor recycle flow; and
$Q_{SP}$=surge control setpoint flow.

Thus, the CEF for each compressor, 18 and 34, is representative of the operating margin for the corresponding compressor. The net export flow $Q_{OUT}$ for each of the compressors, 18 and 34, is further defined by the following expression:

$$Q_{OUT}=Q_{IN}-Q_{REC} \qquad (2)$$

Thus, when there is no recycle flow, the CEF is equal to the ratio of the compressor inlet flow $Q_{IN}$ to the surge control setpoint flow $Q_{SP}$.

First and second surge controllers, 48 and 50, are operably coupled to: (1) the first recycle valve 24, the pressure transducers, 26a and 26b, the flow element 28, and a first load sharing controller 52; and (2) the second recycle valve 40, the pressure transducers, 42a and 42b, the flow element 44, and a second unit load sharing controller 54, respectively. The first and second surge controllers, 48 and 50, receive the signals, $FE1_{IN}$, $PT1_{IN}$ and $PT1_{OUT}$ and $FE2_{IN}$, $PT2_{IN}$ and $PT2_{OUT}$, respectively, and generate output signals, RV1 and RV2, respectively, for controlling the operation of the first and second recycle valves, 24 and 40, respectively, and output signals, $Q_{OP1}$ and $Q_{OP2}$, respectively, that are processed by the first and second unit load sharing controllers, 52 and 54, respectively.

In an exemplary embodiment, when the operating points of the first and second compressors, 18 and 34, are to the right of or below the surge control lines for the first and second compressors, the first and second recycle valves, 24 and 40, are closed, and when the operating points of the first and second compressors are to the left of or above the surge control lines for the first and second compressors, the first and second recycle valves, respectively, are opened in proportion to the degree to which the operating points of the first and second compressors are to the left of or above the corresponding surge control lines. In an exemplary embodiment, the output signals $Q_{OP1}$ and $Q_{OP2}$ are representative of the operating points of the first and second compressors, 18 and 34, respectively, including the compression ratios and the percentage flow coefficients. Thus, the surge controllers, 48 and 50, control the operation of the recycle valves, 24 and 40, respectively, in order to prevent surge in the first and second compressors, 18 and 24, respectively. In an exemplary embodiment, the design and operation of the first and second surge controllers, 48 and 50, are provided substantially as disclosed in U.S. Pat. No. 5,195,875, the disclosure of which is incorporated herein by reference.

The first and second unit load sharing controllers, 52 and 54, are operably coupled to the first and second turbine controllers, 30 and 46, respectively, the first and second surge controllers, 48 and 50, respectively, a high select 60, and a central controller 62 that generates a signal CEFSP that is representative of a common CEF setpoint for the first and second compressors, 18 and 34. The first and second unit load sharing controllers, 52 and 54, include coefficient of export flow (CEF) calculators, 64 and 66, respectively, and proportional-integral-differential (PID) controllers, 68 and 70, respectively. The CEF calculators, 64 and 66, receive the signals, $Q_{OP1}$ and RV1 and $Q_{OP2}$ and RV2, respectively and generate signals, $CEFACTUAL_1$ and $CEFACTUAL_2$, respectively, that are representative of the actual CEF values for the first and second compressors, 18 and 34, in a conventional manner. The PID controllers, 68 and 70, receive the signals $CEFACTUAL_1$, RV1, $T1B_{ROT}$, and CEFSP and $CEFACTUAL_2$, RV2, $T2B_{ROT}$, and CEFSP, respectively, and generate signals, $T1A_{ROT}$ and $T2A_{ROT}$. In an exemplary embodiment, the signals, $T1A_{ROT}$ and $T2A_{ROT}$, are representative of the operating speed set points of the first and second compressors, 18 and 34. In this manner, the operating speed of the first and second compressors, 18 and 34, are controlled based upon a common CEF setpoint. In an exemplary embodiment, the PID controllers, 68 and 70, incorporate the PID computer software V.305 commercially available from Dresser Equipment Group, Inc., 2601 Beltline Road, Carrollton, Tex. 75006.

The high select 60 is operably coupled to the first and second unit load sharing controllers, 52 and 54, and the central controller 62. The high select 60 receives the signals, $CEFACTUAL_1$ and $CEFACTUAL_2$, from the unit load sharing controllers, 52 and 54, respectively, that are representative of the actual CEF values for the first and second compressors, 18 and 34, respectively, and generates a signal HS that is representative of the signal, $CEFACTUAL_1$ or $CEFACTUAL_2$, having the highest value. In this manner, the high select 60 receives the actual CEF values for the first and second compressors, 18 and 34, and then selects the highest CEF value.

The central controller 62 is operably coupled to the first and second load sharing controllers, 52 and 54, the high select 60, and a pressure transducer 76 that is operably coupled to the suction line 12 and that generates a signal PV that is representative of the operating pressure in the suction line 12. The central controller 62 includes a PID controller 78 that receives the signal PV and a signal SP that is representative of a user defined setpoint value for the suction pressure and generates the signal CEFSP. The signal SP may be provided by a conventional user interface. The central controller 62 also includes a low select 80 that receives the signals HS and CEFSP and generates a signal 82 that is representative of the signal, HS or CEFSP, having the lowest value. The signal 82 is fed back to the PID controller 78 as part of a feedback loop.

The combined use of the high select 60 and the low select 80 ensures that the central controller 62 only processes actual CEF values from compressor trains that are online while eliminating zero or negative actual CEF values for compressor trains that are shutdown. The use of the feedback signal 82 in the central controller 62 ensures that integration windup will not occur in situations in which the compressor trains may not be able to satisfy the process flow requirements.

Figure 3:
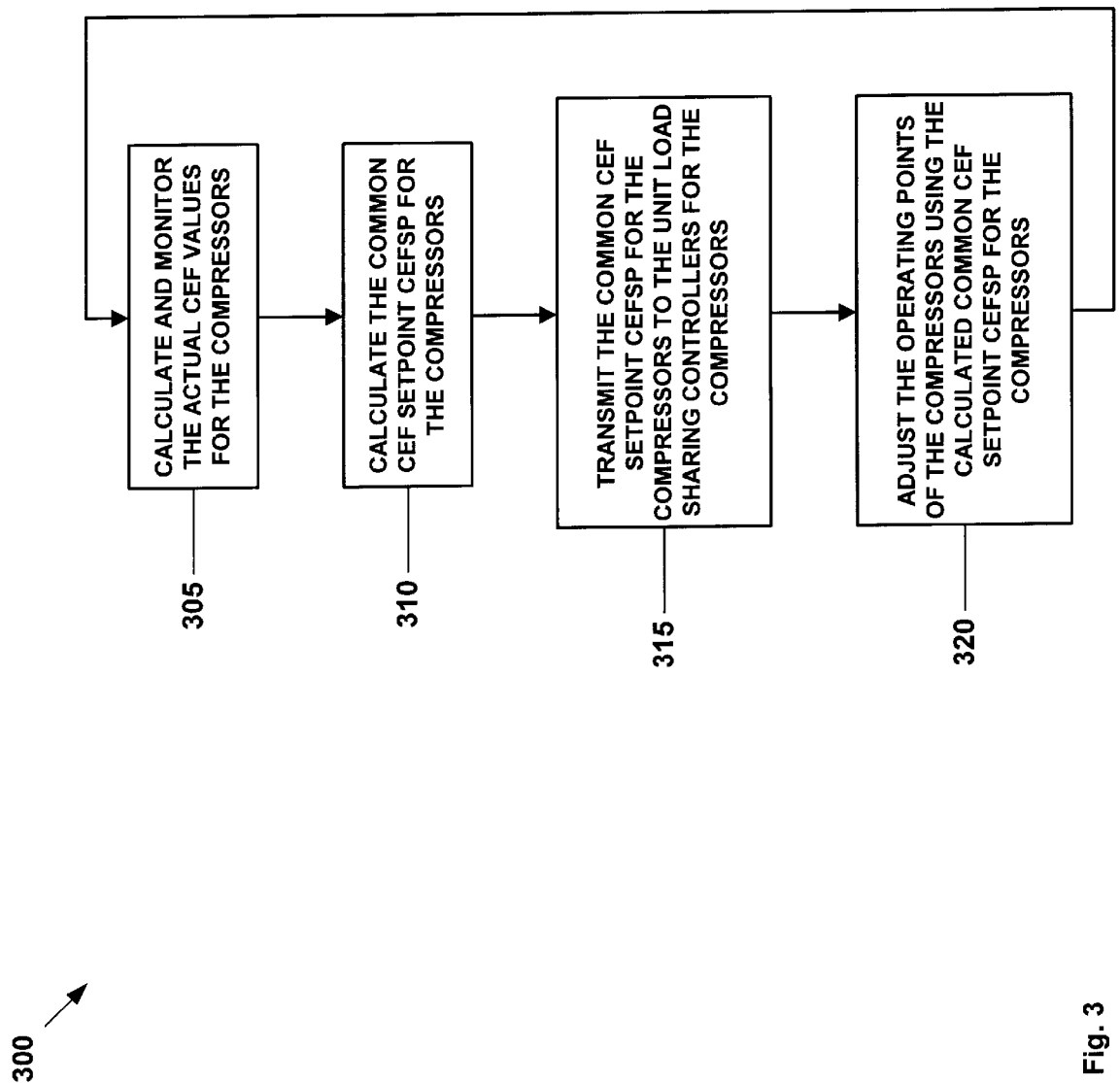
FIG. 3 is a flow chart illustration of an exemplary embodiment of the operation of the control system of FIGS. 1a–1d.

In an exemplary embodiment, during operation of the control system 10, as illustrated in FIG. 3, the control system implements a control program 300 in which the control system calculates and monitors the actual CEF values, CEF $ACTUAL_1$ AND CEF $ACTUAL_2$, for the first and second compressors, 18 and 34, respectively, in step 305. In an exemplary embodiment, in step 305, the actual CEF values, CEF $ACTUAL_1$ AND CEF $ACTUAL_2$, for the first and second compressors, 18 and 34, respectively, are calculated by the load sharing controllers 52 and 54, respectively, as described above.

The control system 10 then calculates the common CEF setpoint CEFSP for the first and second compressors, 18 and 34, respectively, in step 310. In an exemplary embodiment, in step 310, the control system 10 high selects the signals CEF $ACTUAL_1$ and CEF $ACTUAL_2$ using the high select 60 to generate the signal HS, and the signals HS, SP, and PV, are then processed by the central controller 62 to generate the common CEF setpoint CEFSP. The calculated common CEF setpoint CEFSP is then transmitted to the unit load sharing controllers, 52 and 54, in step 315.

The control system 10 then adjusts the operating points, $Q_{OP1}$ and $Q_{OP2}$, of the first and second compressors, 18 and 34, respectively, using the calculated common CEF setpoint CEFSP in step 320. In an exemplary embodiment, in step 320, the unit load sharing controllers, 52 and 54, receive the signals, $Q_{OP1}$ and RV1 and $Q_{OP2}$ and RV2, respectively and generate the signals, $T1A_{ROT}$ and $T2A_{ROT}$, and thereby adjust the operating points, $Q_{OP1}$ and $Q_{OP2}$, of the first and second compressors, 18 and 34, respectively.

Steps 305, 310, 315, and 320 are then continually repeated by the system 10 to provide load balancing.

In an exemplary implementation of the system 10, the first compressor 18 is operating and the second compressor is in the shut down mode. During operation of the first compressor 18, the operating speed of the first compressor is modulated by the unit load sharing controller 52 as a function of the common CEF setpoint CEFSP provided by the central controller 62. In an exemplary embodiment, the actual CEF value CEF $ACTUAL_1$ of the first compressor 18 is equal to 1.7 and the recycle valve 24 is fully closed. Furthermore, in an exemplary embodiment, the common CEF setpoint CEFSP provided by the central controller 62 is equal to 1.7.

During an initial stage of operation of the second compressor 34, the second compressor is started up with the recycle valve 40 fully open, and the second compressor remains in the full recycle mode of operation until the second compressor reaches a predetermined minimum governing speed. During the initial stage of operation of the second compressor 34, the second compressor does not develop enough pressure head to contribute any export flow to the discharge line 14 and the actual CEF value CEF $ACTUAL_2$ of the second compressor is equal to zero. During operation of the second compressor 34, the operating speed of the second compressor is modulated by the unit load sharing controller 54 as a function of the common CEF setpoint CEFSP provided by the central controller 62. In an exemplary embodiment, the common CEF setpoint CEFSP provided by the central controller 62 is equal to 1.7. However, during the initial stage of operation of the second compressor 34, the operating speed of the second compressor 34 is forced to a minimum operating speed since the second turbine 32 is still idling and warming up.

Figure 4A:
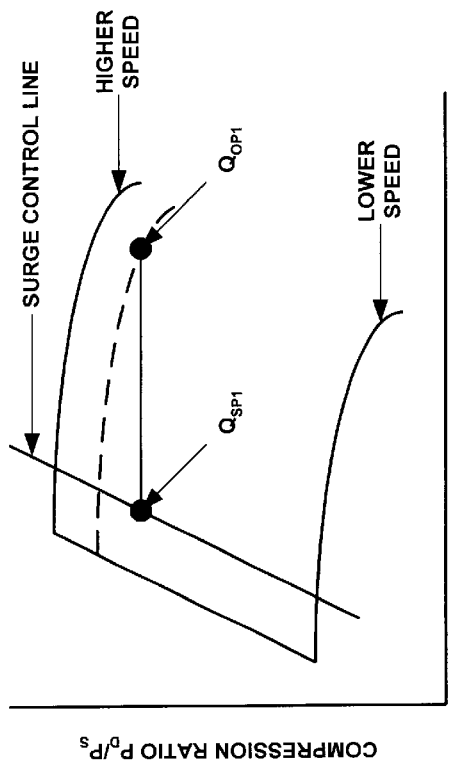
FIGS. 4a and 4b are graphical illustrations of an exemplary embodiment of the continued operation and the initial stage of operation of the first and second compressors of the control system of FIGS. 1a–1d.
Figure 4B:
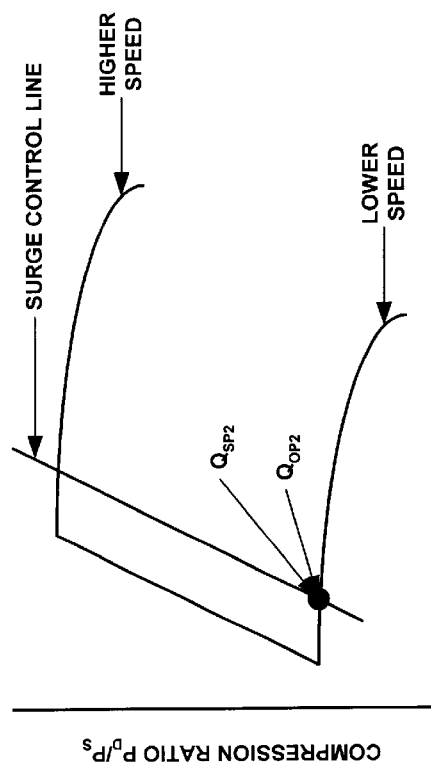

Thus, as illustrated in FIGS. 4a and 4b, during the continued operation of the first compressor 18 and the initial stage of operation of the second compressor 34, the common CEF setpoint SEFSP is equal to 1.7, the actual CEF value CEF ACTUAL$_1$ of the first compressor 18 is equal to 1.7, the recycle valve 24 is fully closed, the actual CEF value CEF ACTUAL$_2$ of the second compressor 34 is equal to 0.0, and the recycle valve 40 is fully open.

During an intermediate stage of operation, the second compressor 18 becomes ready to load, the surge controller 50 starts to ramp close the recycle valve 40, and the unit load sharing controller 54 starts to increase the operating speed setpoint T2A$_{ROT}$ of the second compressor 34 in order to permit the second compressor to begin exporting flow into the discharge line 14 and thereby attain the common CEF setpoint CEFSP of 1.7. As the operating speed T2B$_{ROT}$ of the second compressor 34 increases, the second compressor begins to export flow into the discharge line 14, and the suction pressure SP in the suction line 12 will drop.

As a result of the drop in the suction pressure SP in the suction line 12, the common CEF setpoint CEFSP calculated by the central controller 62 will decrease. In an exemplary embodiment, the common CEF setpoint CEFSP during the intermediate stage of operation of the second compressor 34 is thereby reduced to 1.4. The decreased common CEF setpoint CEFSP is then processed by the unit load sharing controllers, 52 and 54, of the first and second compressors, 18 and 34, respectively, to thereby modulate the operating speeds, T1B$_{ROT}$ and T2B$_{ROT}$, of the first and second compressors. As a result, the operating speed setpoint T1A$_{ROT}$ of the first compressor 18 is reduced in order to attain the new common CEF setpoint CEFSP of 1.4 thereby reducing the export flow from the first compressor to the discharge line 14. However, the operating speed setpoint T2A$_{ROT}$ of the second compressor 34 is increased to permit the second compressor to attain the common CEF setpoint CEFSP of 1.4. In an exemplary embodiment, during the intermediate stage of operation of the second compressor 34, the actual CEF value CEF ACTUAL$_2$ of the second compressor is 0.55. Since the actual CEF value CEF ACTUAL$_2$ of the second compressor 34 attained by the second compressor during the intermediate stage of operation is still less than the common CEF setpoint CEFSP, the unit load sharing controller 54 will keep increasing the operating speed setpoint T2A$_{ROT}$ and thereby keep increasing the export flow of the second compressor to the discharge line 14. At this point, the second compressor 34 is considered to at least partially online.

Figure 5A:
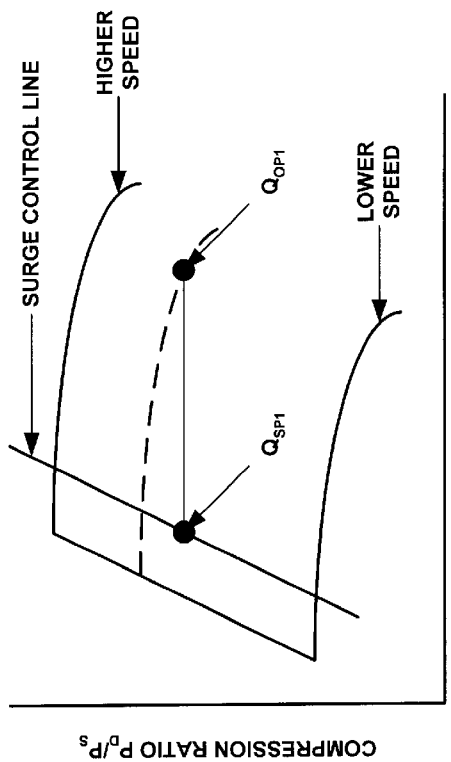
FIGS. 5a and 5b are graphical illustrations of an exemplary embodiment of the continued operation and the intermediate stage of operation of the first and second compressors of the control system of FIGS. 1a–1d.
Figure 5B:
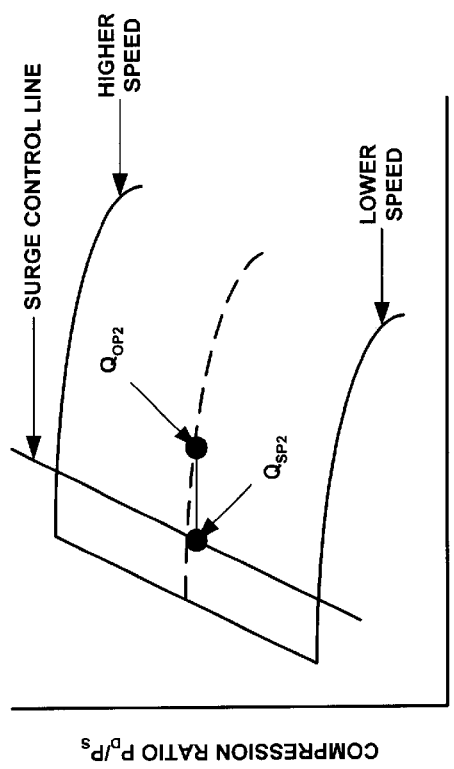

Thus, as illustrated in FIGS. 5a and 5b, during the continued operation of the first compressor 18 and the intermediate stage of operation of the second compressor 34, the common CEF setpoint SEFSP is equal to 1.4, the actual CEF value CEF ACTUAL$_1$ of the first compressor 18 is equal to 1.4, the recycle valve 24 is fully closed, the actual CEF value CEF ACTUAL$_2$ of the second compressor 34 is equal to 0.55, and the recycle valve 40 is fully closed.

During a final stage of operation of the second compressor 34, the second compressor will continue to accelerate and thereby generate more export flow into the discharge line 14. As a result, the suction pressure SP in the suction line 12 will drop even further. As a result of the further drop in the suction pressure SP in the suction line 12, the common CEF setpoint CEFSP calculated by the central controller 62 will decrease. The decreased CEF setpoint CEFSP will be processed by the unit load controller 52 to further reduce the operating speed setpoint TLA$_{ROT}$ of the first compressor 18 in order to permit the first compressor to attain the decreased CEF setpoint CEFSP. However, the decreased CEF setpoint CEFSP will be processed by the unit load controller 54 to further increase the operating speed setpoint T2A$_{ROT}$ of the second compressor 34 in order to permit the second compressor 34 to attain the decreased CEF setpoint CEFSP.

Figure 6A:
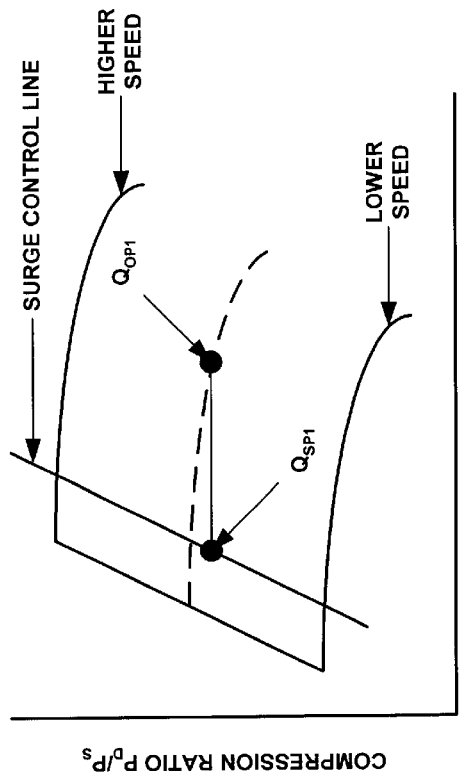
FIGS. 6a and 6b are graphical illustrations of an exemplary embodiment of the continued operation and the final stage of operation of the first and second compressors of the control system of FIGS. 1a–1d resulting in load balancing of the first and second compressors.
Figure 6B:
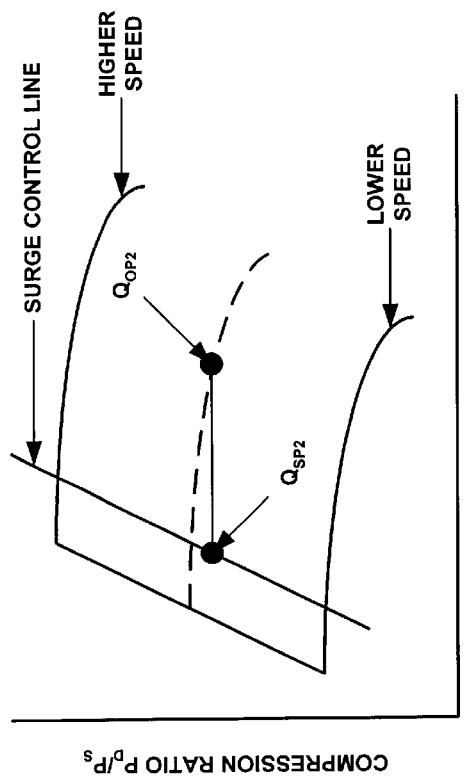
Figure 7A:
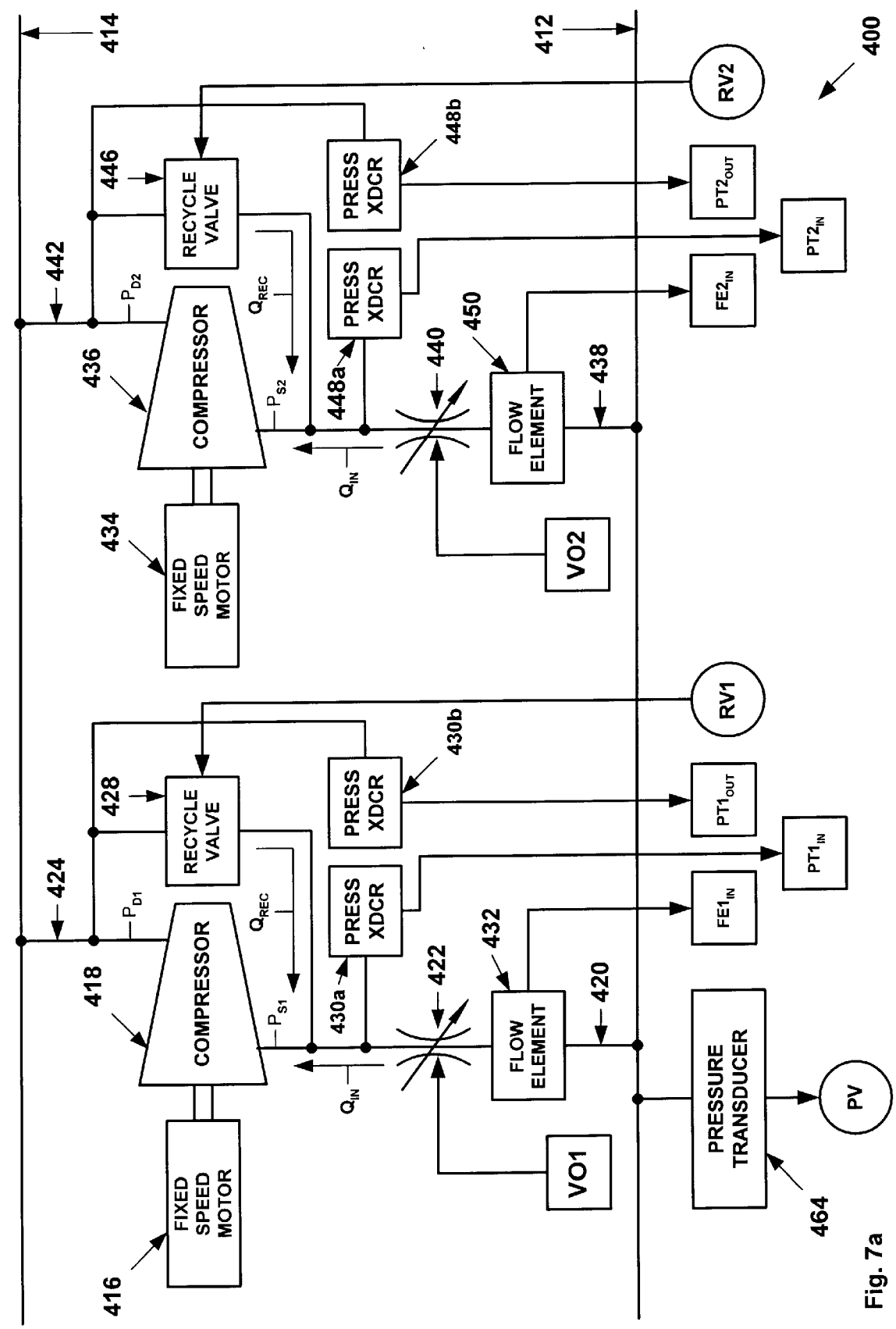
FIGS. 7a–7d are schematic illustrations of an exemplary embodiment of a control system for a plurality of compressors.
Figure 7B:
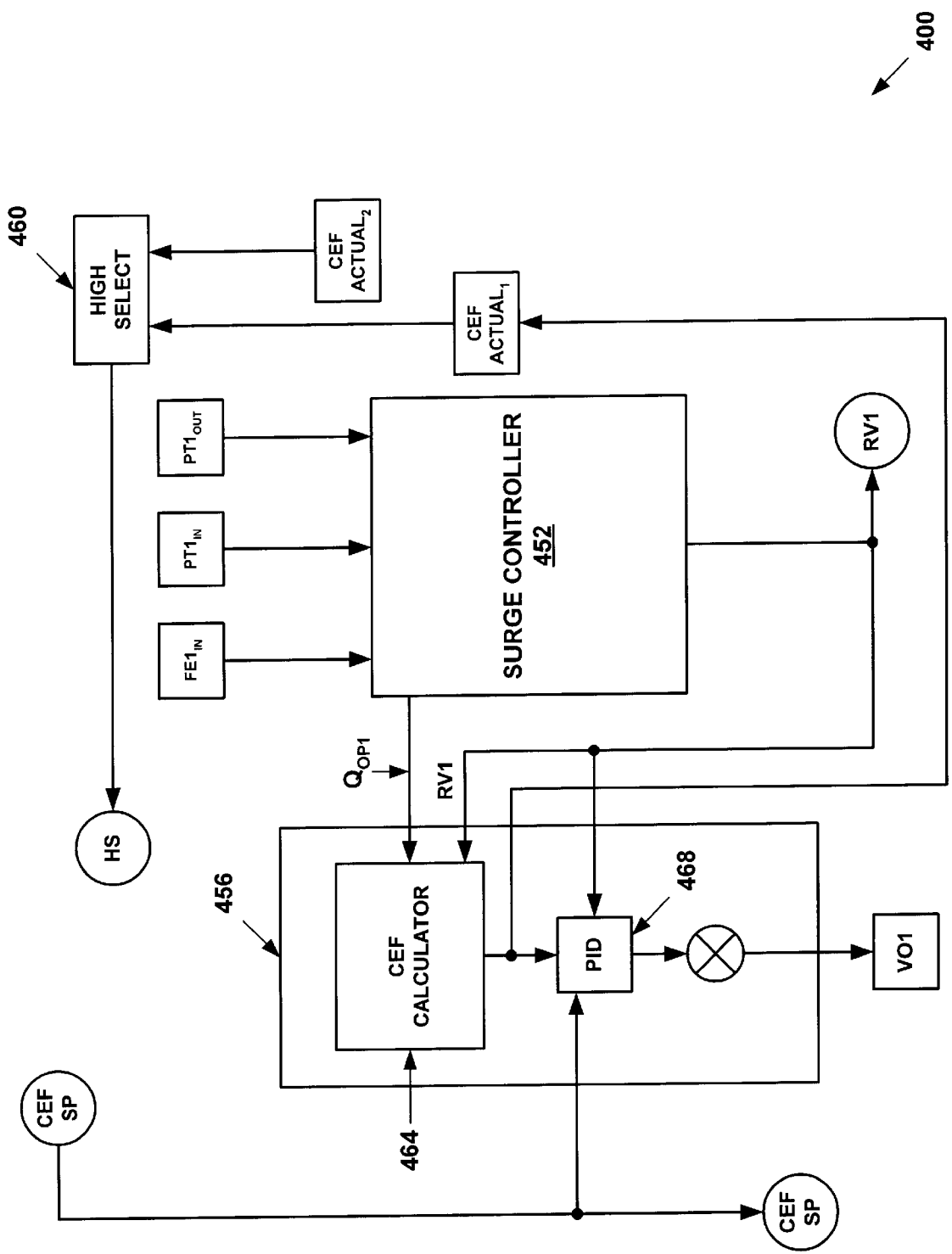
Figure 7C:
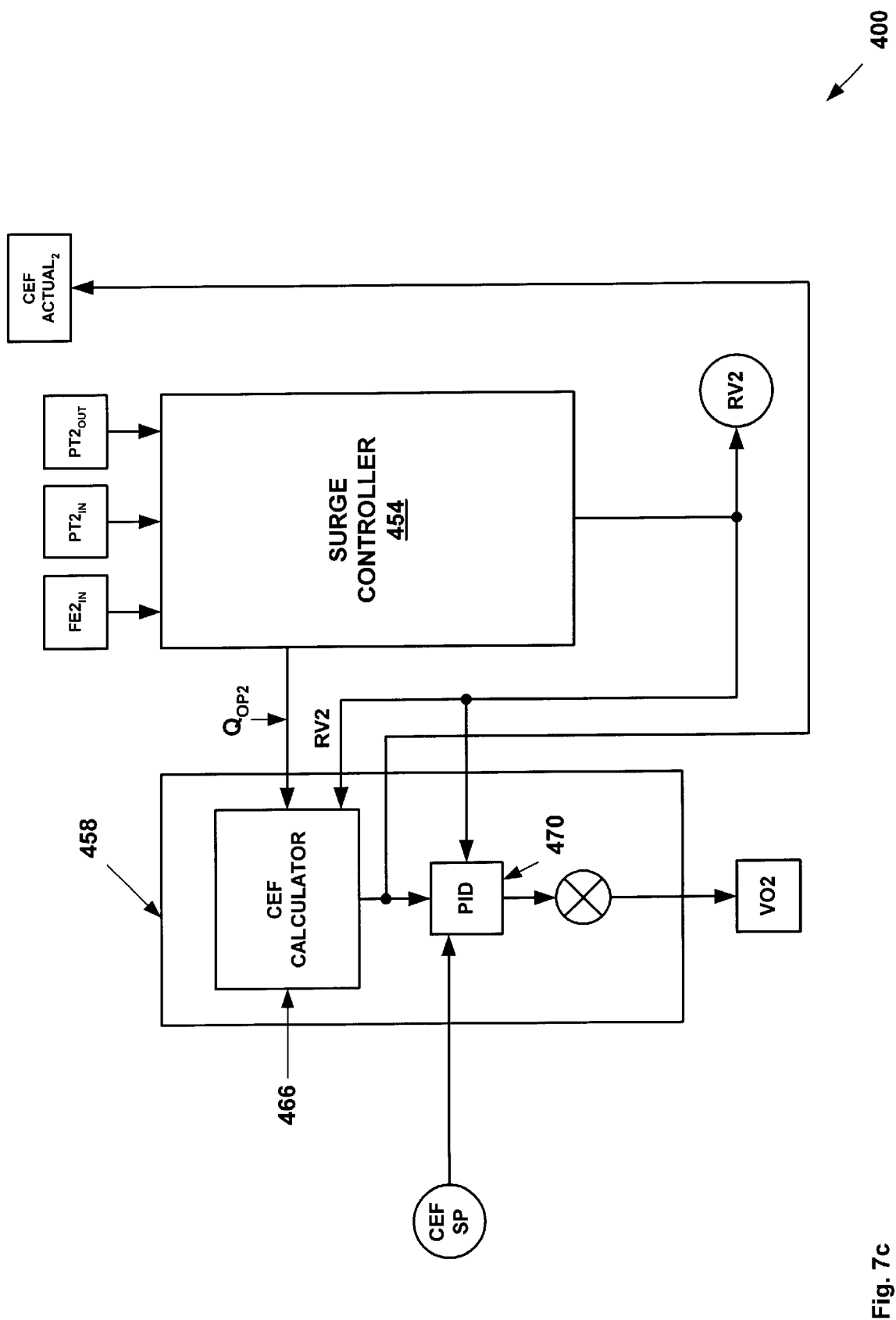
Figure 7D:
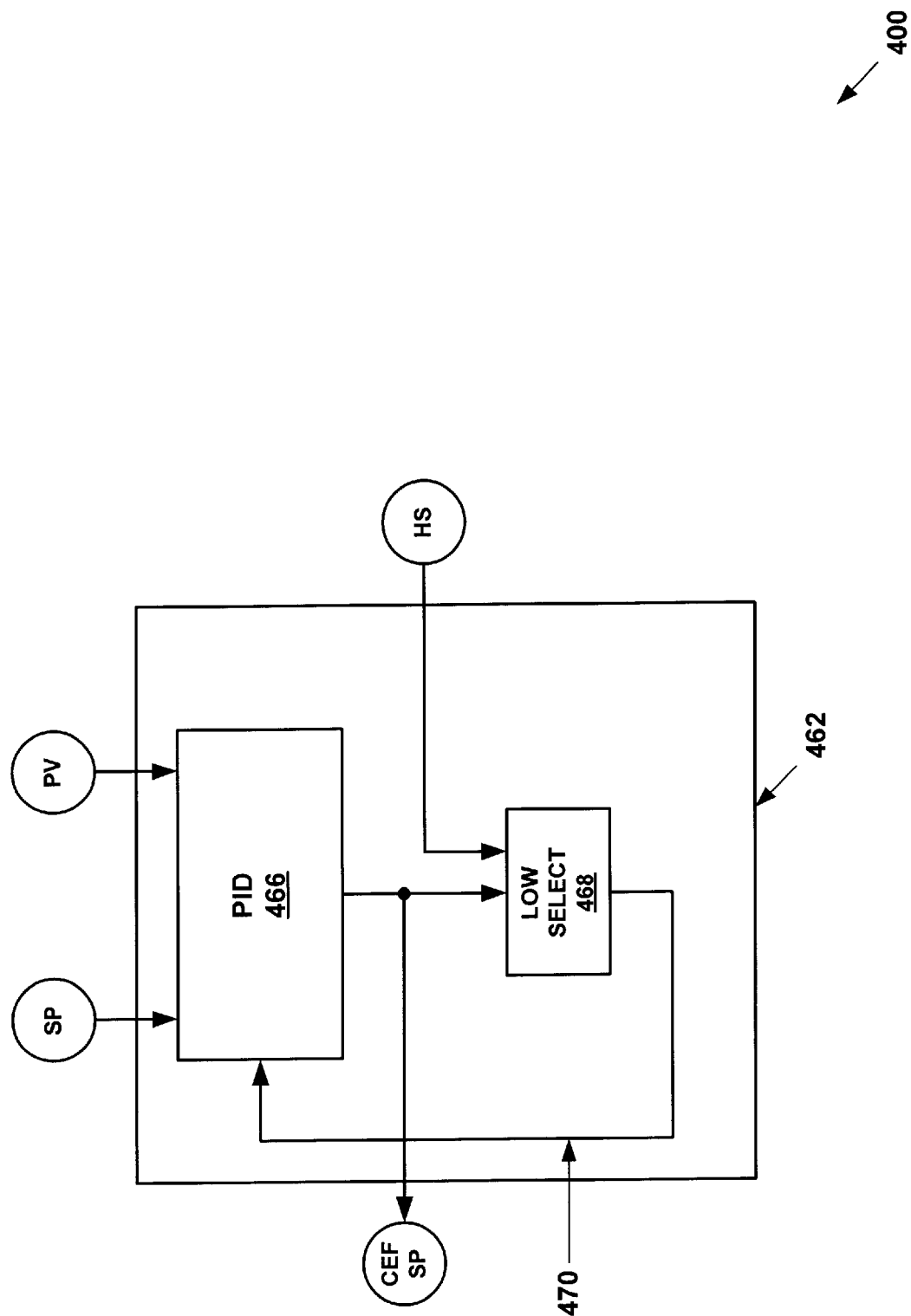

The process of further reduction in the suction pressure SP, further reductions in the common CEF setpoint CEFSP, further reductions in the operating speed setpoint T1A$_{ROT}$ of the first compressor 18, and further increases in the operating speed setpoint T2A$_{ROT}$ of the second compressor 34 will continue until the actual CEF values, CEF ACTUAL$_1$ and CEF ACTUAL$_2$, and the common CEF setpoint CEFSP are equalized. In an exemplary embodiment, as illustrated in FIGS. 6a and 6b, the actual CEF values, CEF ACTUAL$_1$ and CEF ACTUAL$_2$, and the common CEF setpoint CEFSP are equalized at a value of 1.1. Once the actual CEF values, CEF ACTUAL$_1$ and CEF ACTUAL$_2$, and the common CEF setpoint CEFSP are equalized, a complete load balance is achieved, both compressors, 18 and 34, are operating with their operating points, Q$_{OP1}$ and Q$_{OP2}$, having same margin from their respective surge control lines.

Thus, the control system 10 uses the compressor export flow Q$_{OUT}$ as the controlled variable for the corresponding unit load sharing controller and optimizes the compressor export flow with respect to the corresponding surge control line. Furthermore, when the unit load sharing controller decreases the compressor export flow Q$_{OUT}$ to match the process requirements and the operating point for the corresponding compressor reaches the surge control line, even though the compressor flow may be maintained at the value determined by the surge control line, the export flow signal can continue to decrease and thereby provide a dynamic signal for the controlled variable of the corresponding unit load sharing controller. Therefore, the corresponding unit load sharing controller can accommodate and adjust to small variations in the operating speed of the corresponding compressor train and allow the recycle flow to increase in order to adjust the export flow Q$_{OUT}$ into the process. As a result, recycle flow for the compressors of the system 10 are also optimized with respect to the surge control line. Finally, decoupling between the surge controllers and the corresponding unit load sharing controllers is also provided thereby ensuring control stability during the time that the unit load sharing controllers are optimizing the export and recycle flows for the compressors.

Referring to FIGS. 7a, 7b, 7c, and 7d, the reference numeral 400 refers, in general, to an alternative embodiment of a control system for controlling a plurality of compressor trains that includes a suction line 412 and a discharge line 414. A first fixed speed motor 416 is operably coupled to a first compressor 418 having an input line 420 that is fluidicly coupled to the suction line 412 by a suction throttle valve 422 and an output line 424 that is fluidicly coupled to the discharge line 414. The first fixed speed motor 416 and the first compressor 418 together define a first compressor train. The output line 424 of the first compressor 418 may be controllably fluidicly coupled to the input line 420 of the first compressor by a first recycle valve 428. Pressure transducers, 430a and 430b, are fluidicly coupled to the input and output lines, 420 and 424, respectively, of the first compressor 418 and generate signals, PT1$_{IN}$ and PT1$_{OUT}$, respectively, that are representative of the operating pressures, P$_{S1}$ and P$_{D1}$, respectively, in the input and output lines, respectively, of the first compressor. A flow element 432 is fluidicly coupled to the input line 420 of the first compressor 418 and generates signals FE1$_{IN}$ that are representative of the flow rate in the input line.

A second fixed speed motor 434 is operably coupled to a second compressor 436 having an input line 438 that is fluidicly coupled to the suction line 412 by a suction throttle valve 440 and an output line 442 that is fluidicly coupled to the discharge line 414. The second fixed speed motor 434 and the second compressor 436 together define a second compressor train. The output line 442 of the second compressor 436 may be controllably fluidicly coupled to the input line 438 of the second compressor by a second recycle valve 446. Pressure transducers, 448a and 448b, are fluidicly coupled to the input and output lines, 438 and 442, respectively, of the second compressor 436 and generate signals, $PT2_{IN}$ and $PT2_{OUT}$, that are representative of the operating pressures, $P_{S2}$ and $P_{D2}$, respectively, in the input and output lines, respectively, of the second compressor. A flow element 450 is fluidicly coupled to the input line 438 of the second compressor 436 and generates signals $FE2_{IN}$ that are representative of the flow rate in the input line.

Figure 8:
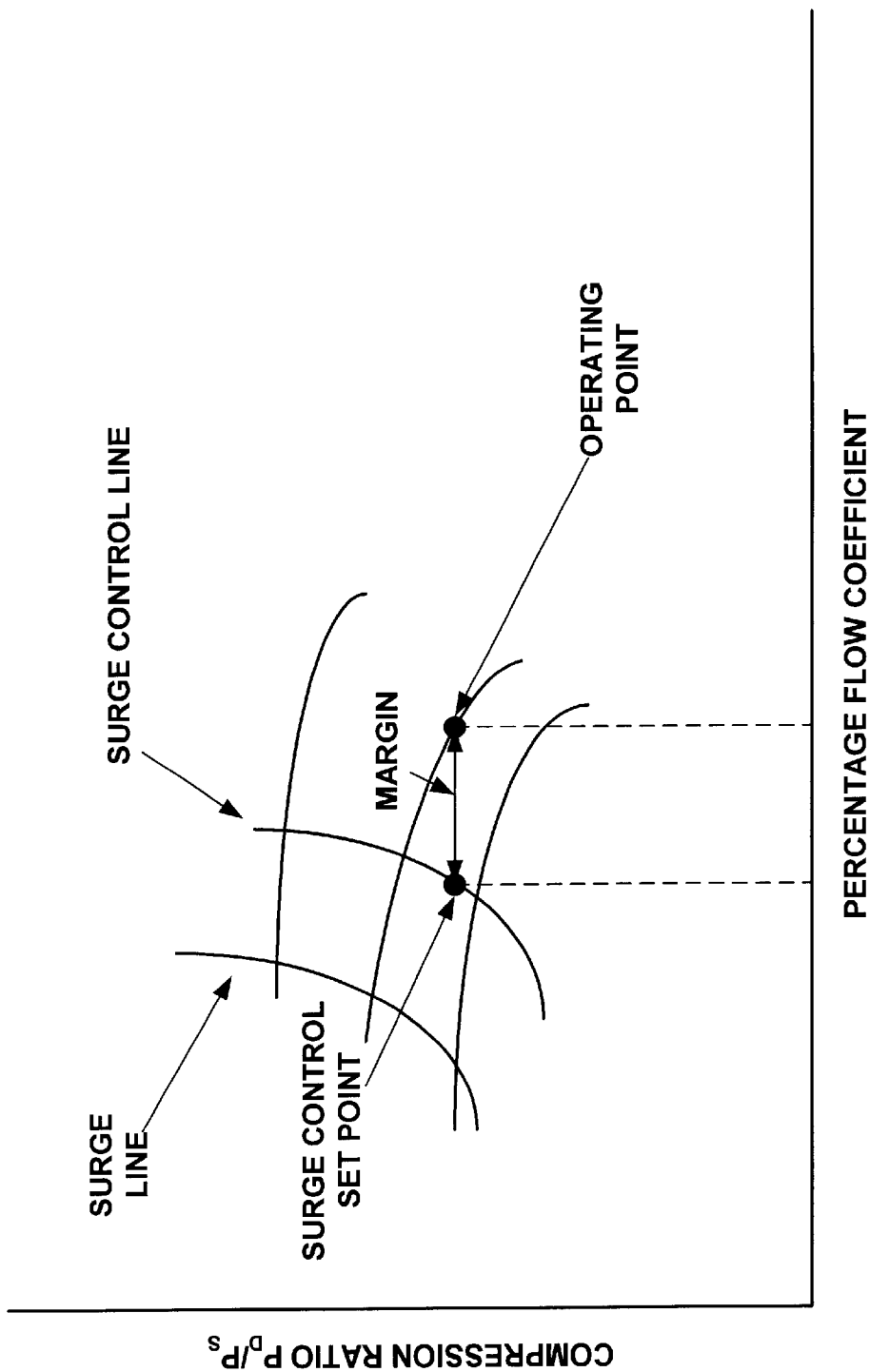
FIG. 8 is a graphical illustration of an exemplary embodiment of a compressor performance curve plotted in terms of the compression ratio versus the percentage flow coefficient for the control system of FIGS. 7a–7d.

Referring to FIG. 8, a surge control line defines when the corresponding recycle valves, 428 and/or 446, are opened to permit compressor recycle flow. Moreover, for any given compression ratio $P_D/P_S$, a surge control set point $Q_{SP}$ defines when the corresponding recycle valves, 428 and/or 446, are opened to permit compressor recycle flow. Furthermore, when the operating point of the compressors, 418 and/or 436, are to the right of or below the corresponding surge control line, the corresponding recycle valves, 428 and/or 446, will remain closed. The degree to which the operating point of the compressors, 418 and/or 436, are to the right of the corresponding surge control set point defines the operating margin. However, when the operating point of the compressors, 418 and/or 436, are to the left of or above the corresponding surge control line, the corresponding recycle valves, 428 and/or 436, are opened in order to avoid damaging surge conditions.

First and second surge controllers, 452 and 454, are operably coupled to: (1) the first recycle valve 428, the pressure transducers, 430a and 430b, the flow element 432, and a first load sharing controller 456; and (2) the second recycle valve 446, the pressure transducers, 448a and 448b, the flow element 450, and a second unit load sharing controller 458, respectively. The first and second surge controllers, 452 and 454, receive the signals, $FE1_{IN}$, $PT1_{IN}$ and $PT1_{OUT}$ and $FE2_{IN}$, $PT2_{IN}$ and $PT2_{OUT}$, respectively, and generate output signals, RV1 and RV2, respectively, for controlling the operation of the first and second recycle valves, 428 and 446, respectively, and output signals, $Q_{OP1}$ and $Q_{OP2}$, respectively, that are processed by the first and second unit load sharing controllers, 456 and 458, respectively.

In an exemplary embodiment, when the operating points of the first and second compressors, 418 and 436, are to the right of or below the surge control lines for the first and second compressors, the first and second recycle valves, 428 and 446, are closed, and when the operating points of the first and second compressors are to the left of or above the surge control lines for the first and second compressors, the first and second recycle valves, respectively, are opened in proportion to the degree to which the operating points of the first and second compressors are to the left of or above the corresponding surge control lines. In an exemplary embodiment, the output signals $Q_{OP1\ and\ QOP2}$ are representative of the operating points of the first and second compressors, 418 and 436, respectively, including the compression ratios and the percentage flow coefficients. Thus, the surge controllers, 452 and 454, control the operation of the recycle valves, 428 and 446, respectively, in order to prevent surge in the first and second compressors, 418 and 436, respectively. In an exemplary embodiment, the design and operation of the first and second surge controllers, 452 and 454, are provided substantially as disclosed in U.S. Pat. No. 5,195,875, the disclosure of which is incorporated herein by reference.

The first and second unit load sharing controllers, 456 and 458, are operably coupled to the first and section suction throttle valves, 422 and 440, respectively, the first and second surge controllers, 452 and 454, respectively, a high select 460, and a central controller 462 that generates a signal CEFSP that is representative of a common CEF setpoint for the first and second compressors, 418 and 436. The first and second unit load sharing controllers, 456 and 458, include coefficient of export flow (CEF) calculators, 464 and 466, respectively, and proportional-integral-differential (PID) controllers, 468 and 470, respectively. The CEF calculators, 464 and 466, receive the signals, $Q_{OP1}$ and RV1 and $Q_{OP2}$ and RV2, respectively and generate signals, $CEFACTUAL_1$ and $CEFACTUAL_2$, respectively, that are representative of the actual CEF values for the first and second compressors, 418 and 436, in a conventional manner. The PID controllers, 468 and 470, receive the signals $CEFACTUAL_1$, RV1, and CEFSP and $CEFACTUAL_2$, RV2, and CEFSP, respectively, and generate signals, VO1 and VO2. In an exemplary embodiment, the signals, VO1 and VO2, are representative of the positions of the first and second suction throttle valves, 422 and 440, respectively. In this manner, the positions of the of the first and second suction throttle valves, 422 and 440, are controlled based upon a common CEF setpoint. In an exemplary embodiment, the PID controllers, 468 and 470, incorporate the PID computer software V.305 commercially available from Dresser Equipment Group, Inc., 2601 Beltline Road, Carrollton, Tex. 75006.

The high select 460 is operably coupled to the first and second unit load sharing controllers, 456 and 458, and the central controller 462. The high select 460 receives the signals, $CEFACTUAL_1$ and $CEFACTUAL_2$, from the unit load sharing controllers, 456 and 458, respectively, that are representative of the actual CEF values for the first and second compressors, 418 and 436, respectively, and generates a signal HS that is representative of the signal, $CEFACTUAL_1$ or $CEFACTUAL_2$, having the highest value. In this manner, the high select 460 receives the actual CEF values for the first and second compressors, 418 and 436, and then selects the highest CEF value.

The central controller 462 is operably coupled to the first and second load sharing controllers, 456 and 458, the high select 460, and a pressure transducer 464 that is operably coupled to the suction line 412 and that generates a signal PV that is representative of the operating pressure in the suction line 412. The central controller 462 includes a PID controller 466 that receives the signal PV and a signal SP that is representative of a user defined setpoint value for the suction pressure and generates the signal CEFSP. The signal SP may be provided by a conventional user interface. The central controller 462 also includes a low select 468 that receives the signals HS and CEFSP and generates a feedback signal 470 that is representative of the signal, HS or CEFSP, having the lowest value. The signal 470 is fed back to the PID controller 466 as part of a feedback loop.

The combined use of the high select 460 and the low select 468 ensures that the central controller 462 only processes actual CEF values from compressors that are online while eliminating zero or negative actual CEF values for compressors that are shutdown. The use of the feedback signal 470 in the central controller 462 ensures that integration windup will not occur in situations in which the compressors, 418 and 436, may not be able to satisfy the process flow requirements.

Figure 9:
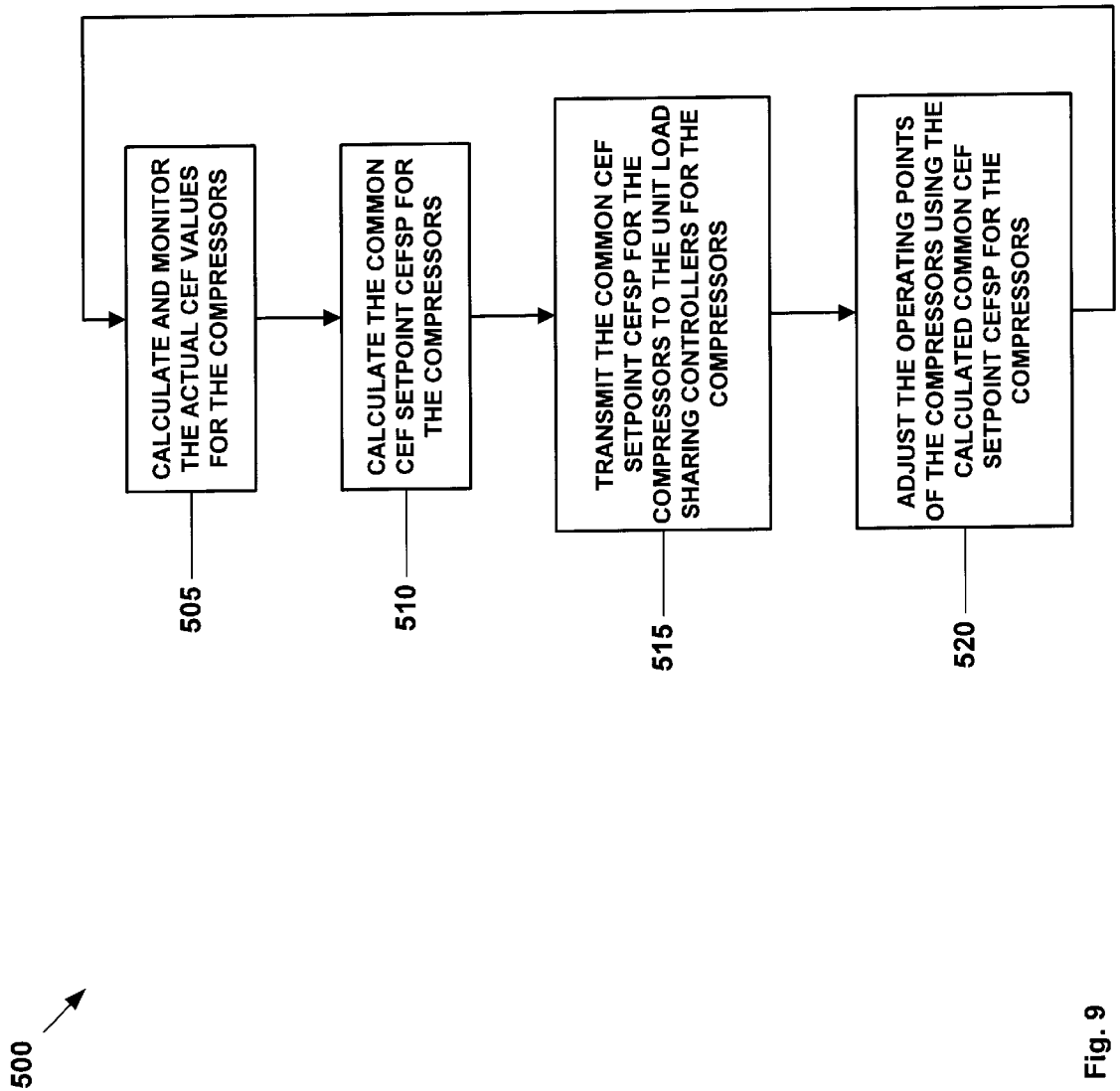
FIG. 9 is a flow chart illustration of an exemplary embodiment of the operation of the control system of FIGS. 7a–7d.
Figure 10A:
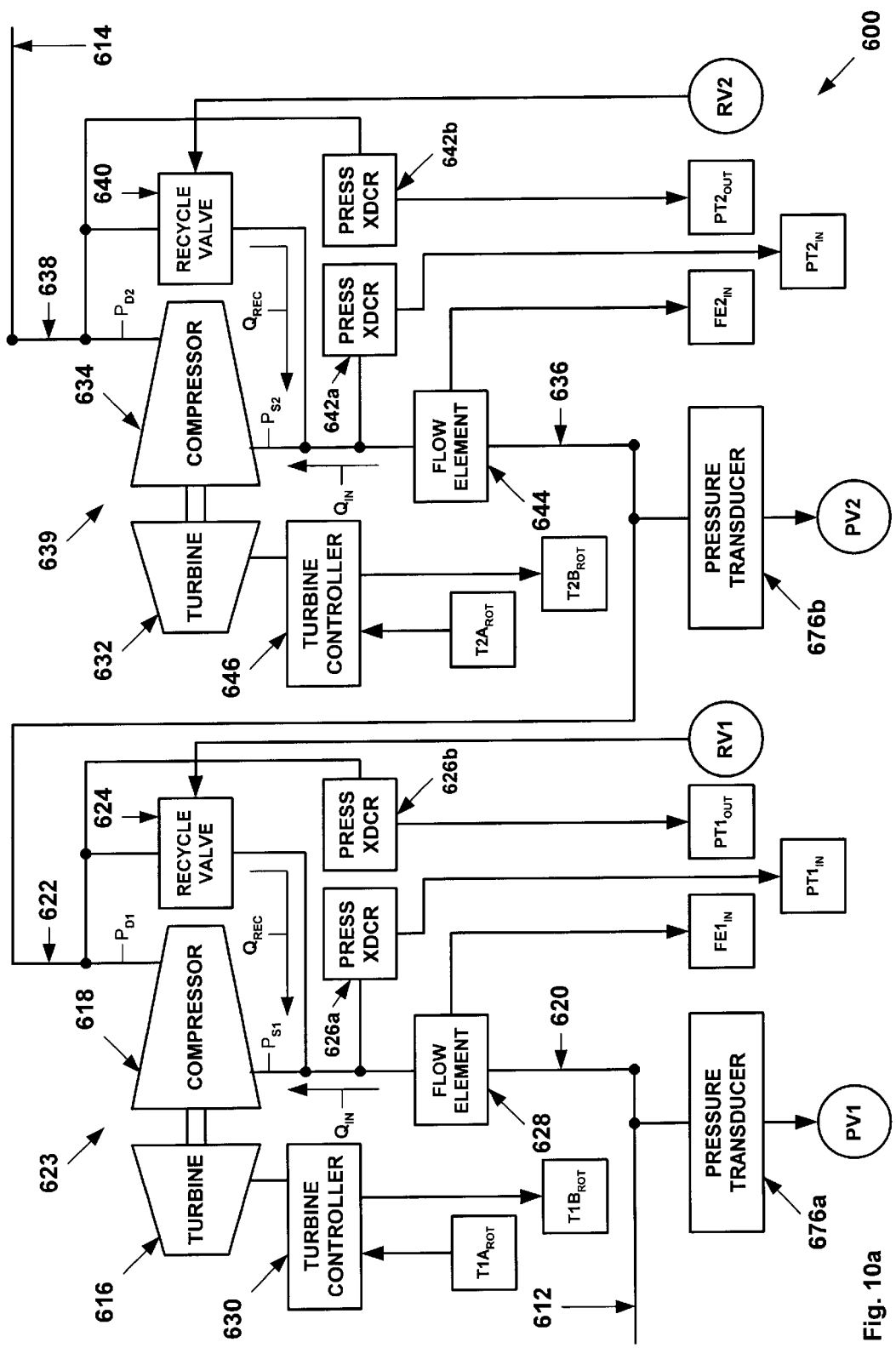
FIGS. 10a–10e are schematic illustrations of an exemplary embodiment of a control system for a plurality of compressors.
Figure 10B:
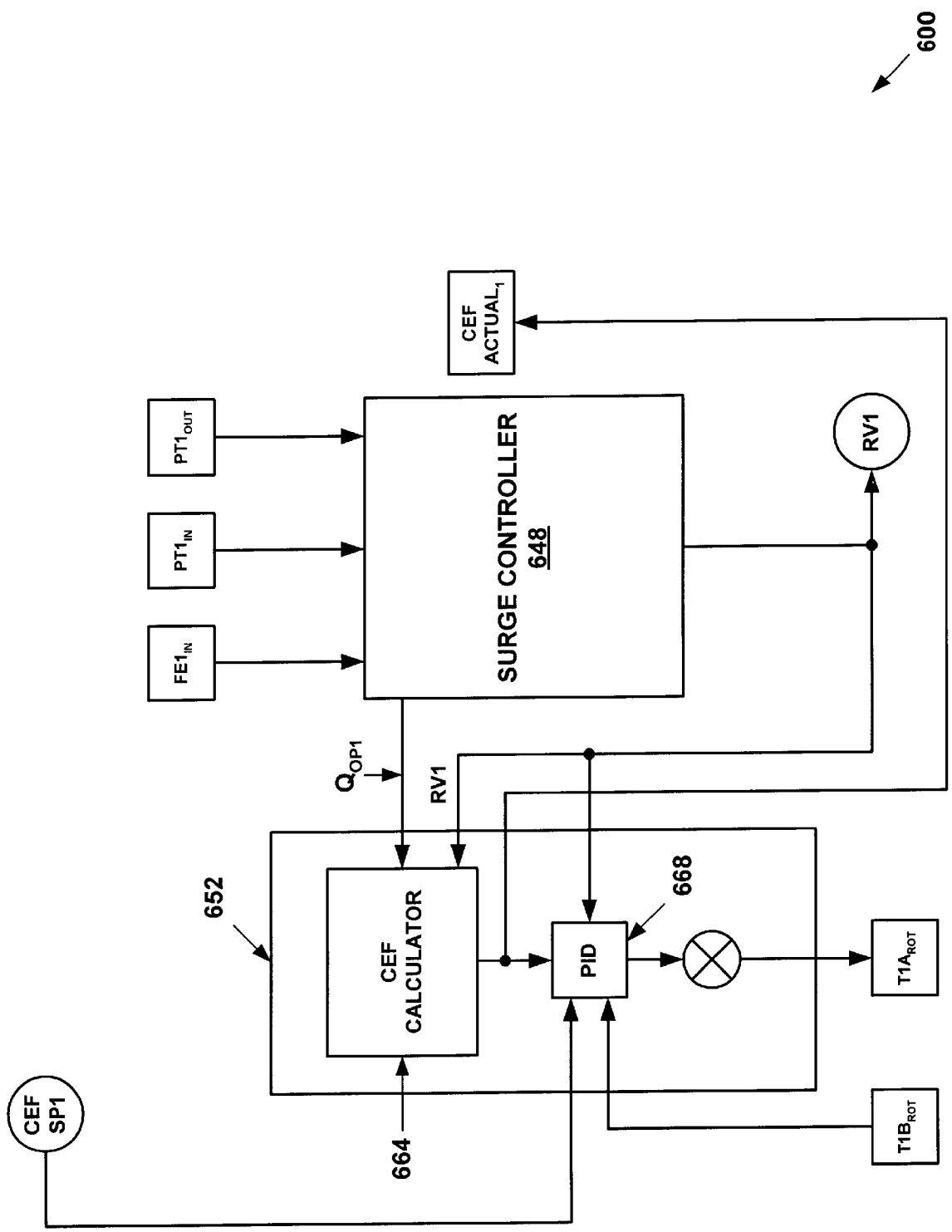
Figure 10C:
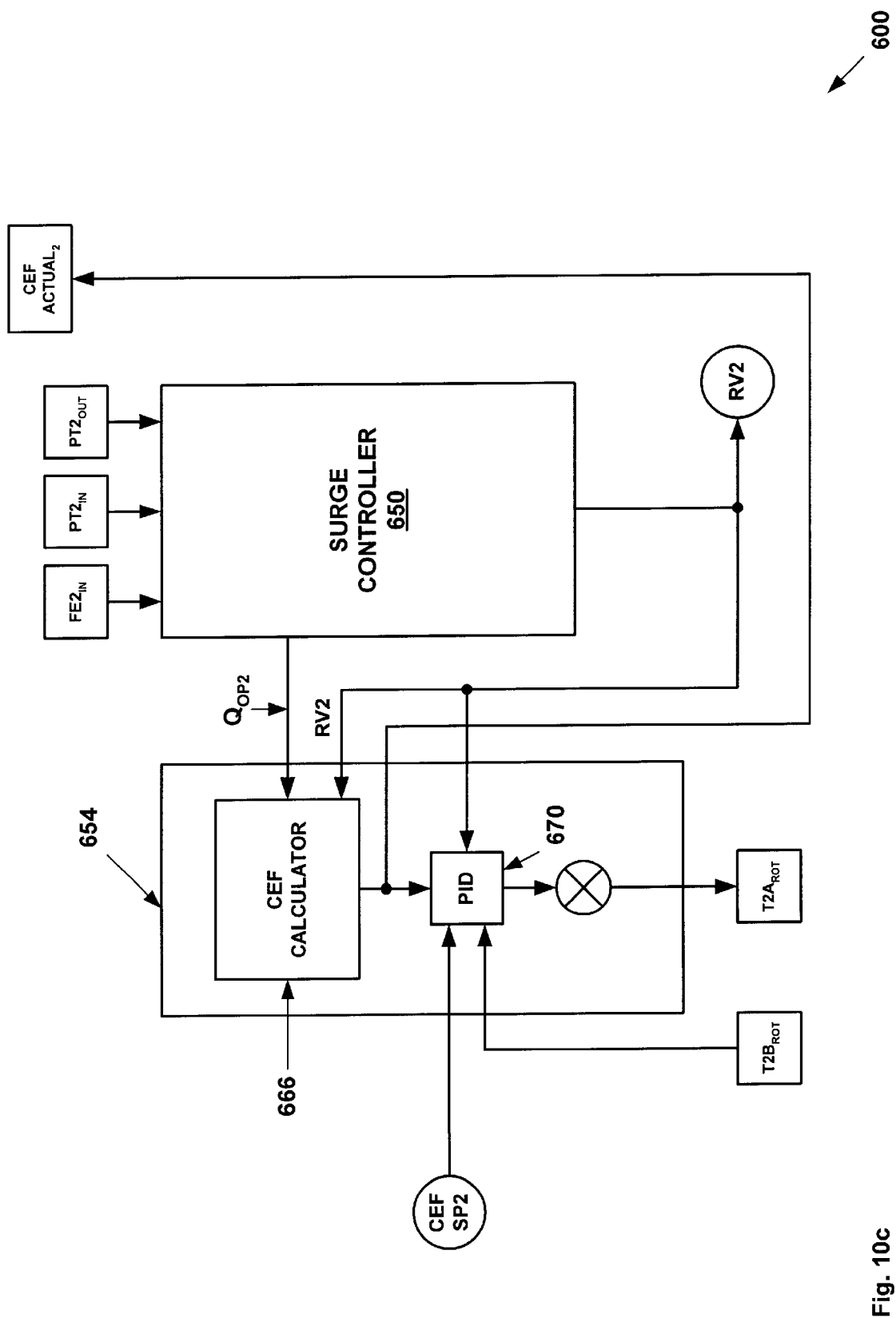
Figure 10D:
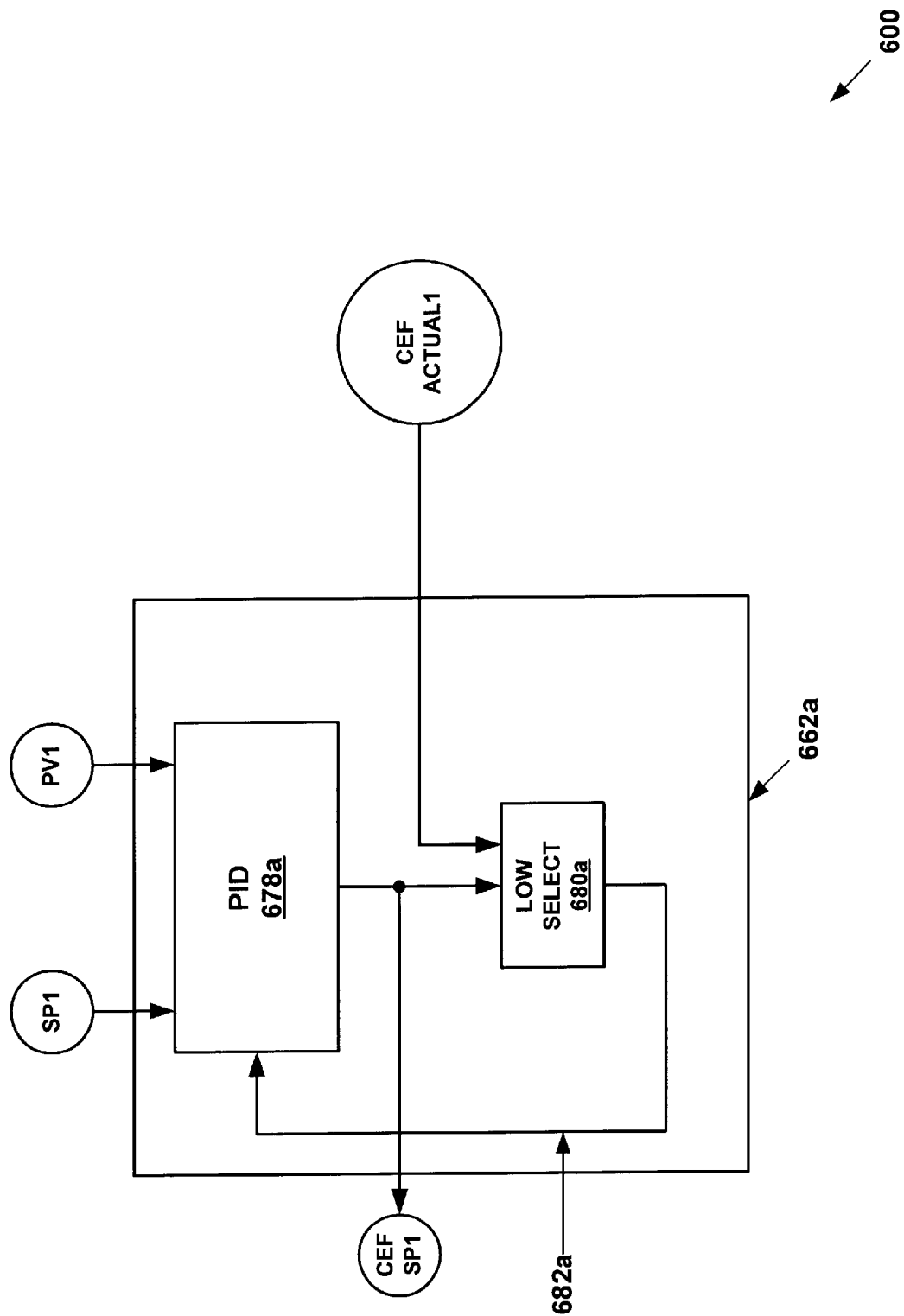
Figure 10E:
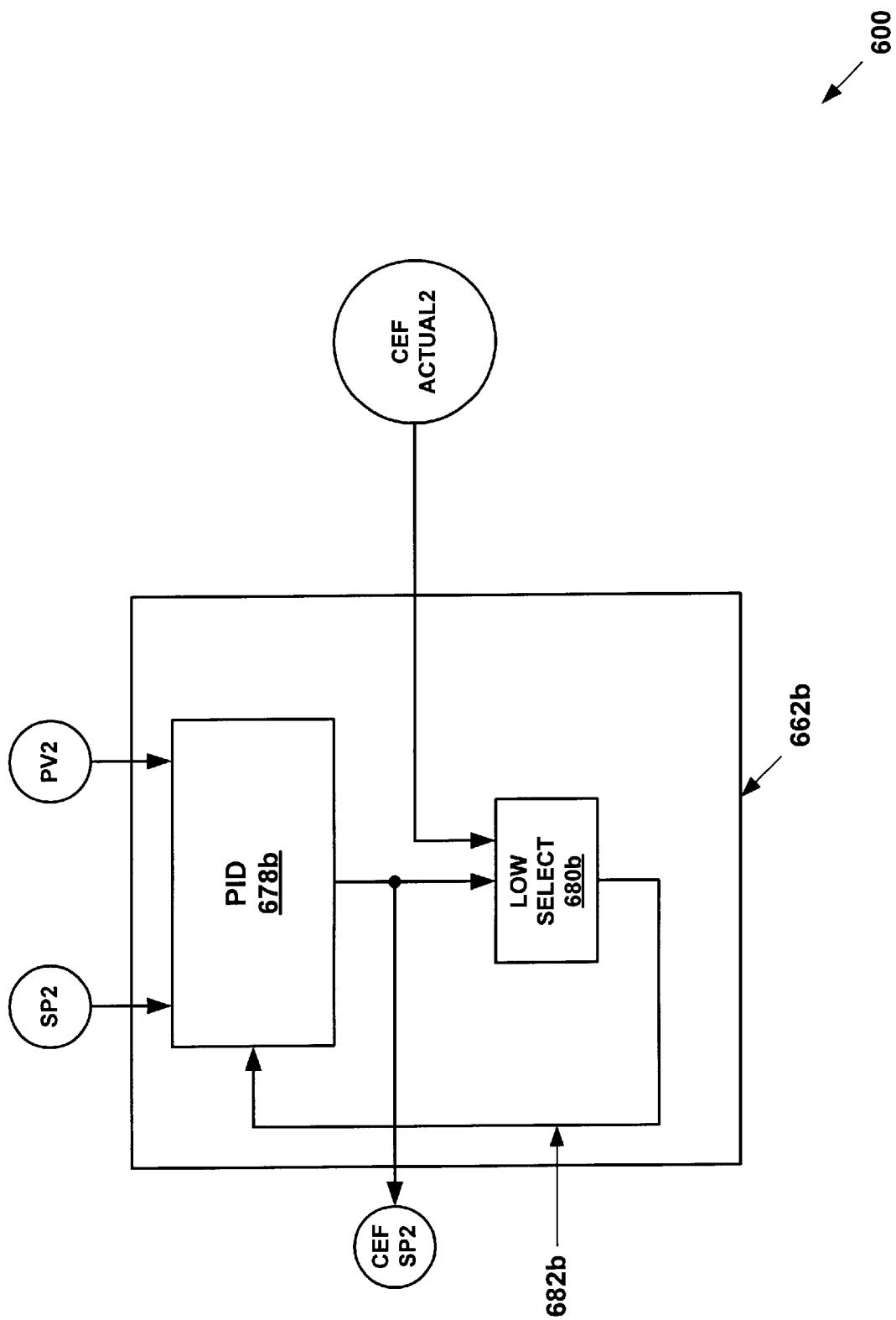

In an exemplary embodiment, during operation of the control system 400, as illustrated in FIG. 9, the control system implements a control program 500 in which the control system calculates and monitors the actual CEF values, CEF ACTUAL$_1$ AND CEF ACTUAL$_2$, for the first and second compressors, 418 and 436, respectively, in step 505. In an exemplary embodiment, in step 505, the actual CEF values, CEF ACTUAL$_1$ AND CEF ACTUAL$_2$, for the first and second compressors, 418 and 436, respectively, are calculated by the load sharing controllers 456 and 458, respectively, as described above.

The control system 400 then calculates the common CEF setpoint CEFSP for the first and second compressors, 418 and 436, respectively, in step 510. In an exemplary embodiment, in step 510, the control system 400 high selects the signals CEF ACTUAL$_1$ and CEF ACTUAL$_2$ using the high select 460 to generate the signal HS, and the signals HS, PV, and SP, are then processed by the central controller 462 to generate the common CEF setpoint CEFSP. The calculated common CEF setpoint CEFSP is then transmitted to the unit load sharing controllers, 456 and 458.

The control system 400 then adjusts the operating points, $Q_{OP1}$ and $Q_{OP2}$, of the first and second compressors, 418 and 436, respectively, using the calculated common CEF setpoint CEFSP in step 520. In an exemplary embodiment, in step 520, the unit load sharing controllers, 456 and 458, receive the signals, $Q_{OP1}$ and RV1 and $Q_{OP2}$ and RV2, respectively and generate the signals, VO1 and VO2 and thereby adjust the operating points, $Q_{OP1}$ and $Q_{OP2}$, of the first and second compressors, 418 and 436, respectively.

Steps 505, 510, 515, and 520 are then continually repeated by the system 400 to provide load balancing.

In an alternative embodiment of the control system 400, adjustable inlet guide vanes with corresponding inlet guide vane controllers may be substituted for the suction throttle valves, 422 and 440.

Referring to FIGS. 10*a*, 10*b*, 10*c*, 10*d*, and 10*e*, the reference numeral 600 refers, in general, to an alternative embodiment of a control system for controlling a plurality of compressor trains that includes a suction line 612 and a discharge line 614. A first turbine 616 is operably coupled to a first compressor 618 having an input line 620 that is fluidicly coupled to the suction line 612 and an output line 622. The first turbine 616 and the first compressor 618 together define a first compressor train 623. The output line 622 of the first compressor 618 may be controllably fluidicly coupled to the input line 620 of the first compressor by a first recycle valve 624. Pressure transducers, 626*a* and 626*b*, are fluidicly coupled to the input and output lines, 620 and 622, respectively, of the first compressor 618 and generate signals, PT1$_{IN}$ and PT1$_{OUT}$, that are representative of the operating pressures, $P_{S1}$ and $P_{D1}$, respectively, in the input and output lines, respectively, of the first compressor. A flow element 628 is fluidicly coupled to the input line 620 of the first compressor 618 and generates signals FE1$_{IN}$ that are representative of the flow rate in the input line. A first turbine controller 630 is operably coupled to the first turbine 616 that controls the operation of the first turbine and generates signals T1B$_{ROT}$ that are representative of the actual rotational speed of the first turbine.

A second turbine 632 is operably coupled to a second compressor 634 having an input line 636 that is fluidicly coupled to the output line 622 of the first compressor 616 and an output line 638 that is fluidicly coupled to the discharge line 614. Thus, the first compressor 616 and the second compressor 634 are connected in series. The second turbine 632 and the second compressor 634 together define a second compressor train 639. The output line 638 of the second compressor 634 may be controllably fluidicly coupled to the input line 636 of the second compressor by a second recycle valve 640. Pressure transducers, 642*a* and 642*b*, are fluidicly coupled to the input and output lines, 636 and 638, respectively, of the second compressor 634 and generate signals, PT2$_{IN}$ and PT2$_{OUT}$, that are representative of the operating pressures, $P_{S2}$ and $P_{D2}$, respectively, in the input and output lines, respectively, of the second compressor. A flow element 644 is fluidicly coupled to the input line 636 of the second compressor 634 and generates signals FE2$_{IN}$ that are representative of the flow rate in the input line. A second turbine controller 646 is operably coupled to the second turbine 632 that controls the operation of the second turbine and generates signals T2B$_{ROT}$ that are representative of the actual rotational speed of the second turbine.

First and second surge controllers, 648 and 650, are operably coupled to: (1) the first recycle valve 624, the pressure transducers, 626*a* and 626*b*, the flow element 628, and a first load sharing controller 652; and (2) the second recycle valve 640, the pressure transducers, 642*a* and 642*b*, the flow element 644, and a second unit load sharing controller 654, respectively. The first and second surge controllers, 648 and 650, receive the signals, FE1$_{IN}$, PT1$_{IN}$ and PT1$_{OUT}$ and FE2$_{IN}$, PT2$_{IN}$ and PT2$_{OUT}$, respectively, and generate output signals, RV1 and RV2, respectively, for controlling the operation of the first and second recycle valves, 624 and 640, respectively, and output signals, $Q_{OP1}$ and $Q_{OP2}$, respectively, that are processed by the first and second unit load sharing controllers, 652 and 654, respectively.

In an exemplary embodiment, when the operating points of the first and second compressors, 618 and 634, are to the right of or below the surge control lines for the first and second compressors, the first and second recycle valves, 624 and 640, are closed, and when the operating points of the first and second compressors are to the left of or above the surge control lines for the first and second compressors, the first and second recycle valves, respectively, are opened in proportion to the degree to which the operating points of the first and second compressors are to the left of or above the corresponding surge control lines. In an exemplary embodiment, the output signals $Q_{OP1}$ and $Q_{OP2}$ are representative of the operating points of the first and second compressors, 618 and 634, respectively, including the compression ratios and the percentage flow coefficients. Thus, the surge controllers, 648 and 650, control the operation of the recycle valves, 624 and 640, respectively, in order to prevent surge in the first and second compressors, 618 and 634, respectively. In an exemplary embodiment, the design and operation of the first and second surge controllers, 648 and 650, are provided substantially as disclosed in U.S. Pat. No. 5,195,875, the disclosure of which is incorporated herein by reference.

The first and second unit load sharing controllers, 652 and 654, are operably coupled to the first and second turbine controllers, 630 and 646, respectively, the first and second surge controllers, 648 and 650, respectively, and central controllers, 662*a* and 662*b*, that generate signals, CEFSP1 and CEFSP2, respectively, that are representative of the CEF setpoints for the first and second compressors, 618 and 634, respectively. The first and second unit load sharing controllers, 652 and 654, include coefficient of export flow (CEF) calculators, 664 and 666, respectively, and proportional-integral-differential (PID) controllers, 668 and 670, respectively. The CEF calculators, 664 and 666, receive the signals, $Q_{OP1}$ and RV1 and $Q_{OP2}$ and RV2, respectively and generate signals, $CEFACTUAL_1$ and $CEFACTUAL_2$, respectively, that are representative of the actual CEF values for the first and second compressors, 618 and 634, in a conventional manner. The PID controllers, 668 and 670, receive the signals $CEFACTUAL_1$, RV1, $T1B_{ROT}$, and CEFSP1 and $CEFACTUAL_2$, RV2, $T2B_{ROT}$, and CEFSP2, respectively, and generate signals, $T1A_{ROT}$ and $T2A_{ROT}$. In an exemplary embodiment, the signals, $T1A_{ROT}$ and $T2A_{ROT}$, are representative of the operating speed set points of the first and second compressors, 618 and 634. In this manner, the operating speed of the first and second compressors, 618 and 634, are controlled based upon the corresponding individual CEF setpoints. In an exemplary embodiment, the PID controllers, 668 and 670, incorporate the PID computer software V.305 commercially available from Dresser Equipment Group, Inc., 2601 Beltline Road, Carrollton, Tex. 75006.

The central controllers, 662a and 662b, are operably coupled to the first and second load sharing controllers, 652 and 654, respectively, and pressure transducers, 676a and 676b, respectively, that are operably coupled to the suction lines, 612 and 636, respectively, and that generate signals, PV1 and PV2, respectively, that are representative of the operating pressures in the suction lines, 612 and 636, respectively. The central controllers, 662a and 662b, include PID controllers, 678a and 678b, respectively, that receive the signals, PV1 and PV2, respectively, and signals, SP1 and SP2, respectively, that are representative of user defined setpoint values for the suction pressures and generate the signals, CEFSP1 and CEFSP2, respectively. The signals, SP1 and SP2, may be provided by a conventional user interface. The central controllers, 662a and 662b, also include low selects, 680a and 680b, that receive the signals, CEFSP1 and CEF ACTUAL1, and CEFSP2 and CEF ACTUAL2, respectively, and generate signals, 682a and 682b, respectively, that are representative of the signals, CEFSP1 or CEF ACTUAL1, and CEFSP2 or CEF ACTUAL2, respectively, having the lowest values. The signals, 682a and 682b, are fed back to the PID controllers, 678a and 678b, respectively, as part of feedback loops.

Figure 11:
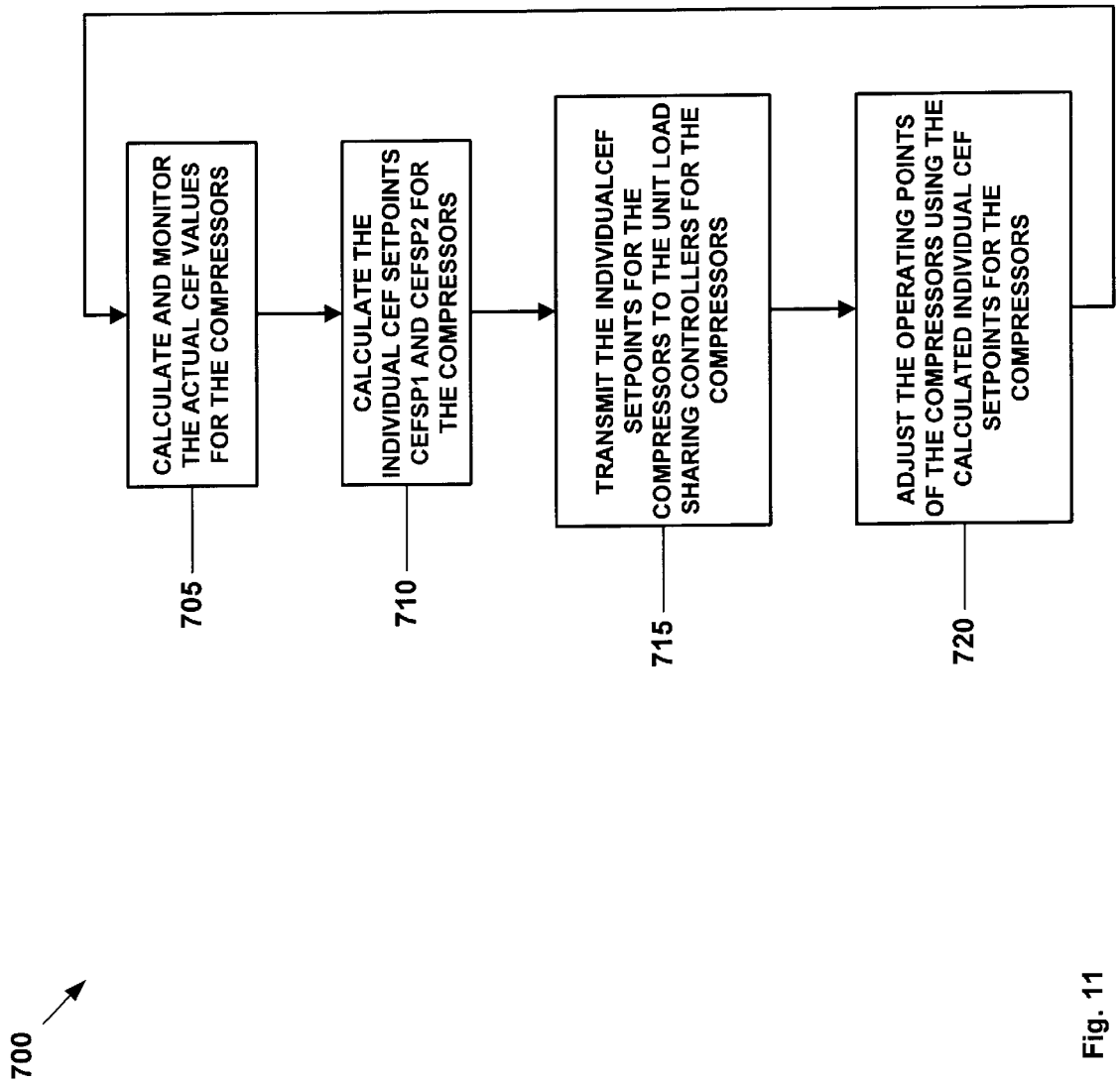
FIG. 11 is a flow chart illustration of an exemplary embodiment of the operation of the control system of FIGS. 10a–10e.

In an exemplary embodiment, during operation of the control system 600, as illustrated in FIG. 11, the control system implements a control program 700 in which the control system calculates and monitors the actual CEF values, CEF $ACTUAL_1$ AND CEF $ACTUAL_2$, for the first and second compressors, 618 and 634, respectively, in step 705. In an exemplary embodiment, in step 705, the actual CEF values, CEF $ACTUAL_1$ AND CEF $ACTUAL_2$, for the first and second compressors, 618 and 634, respectively, are calculated by the load sharing controllers 652 and 654, respectively, as described above.

The control system 600 then calculates the corresponding individual CEF setpoints, CEFSP1 and CEFSP2, respectively, for the first and second compressors, 618 and 634, respectively, in step 710. In an exemplary embodiment, in step 710, the signals PV1, SP1, and CEF ACTUAL1 and PV2, SP2, and CEF ACTUAL2, respectively, are then processed by the central controllers, 662a and 662b, to generate the individual CEF setpoints, CEFSP1 and CEFSP2, respectively. The calculated CEF setpoints, CEFSP1 and CEFSP2, respectively, are then transmitted to the unit load sharing controllers, 652 and 654, respectively, in step 715.

The control system 600 then adjusts the operating points, $Q_{OP1}$ and $Q_{OP2}$, of the first and second compressors, 618 and 634, respectively, using the calculated individual CEF setpoints, CEFSP1 and CEFSP2, in step 720. In an exemplary embodiment, in step 720, the unit load sharing controllers, 652 and 654, receive the signals, $Q_{OP1}$ and RV1 and $Q_{OP2}$ and RV2, respectively and generate the signals, $T1A_{ROT}$ and $T2A_{ROT}$, and thereby adjust the operating points, $Q_{OP1}$ and $Q_{OP2}$, of the first and second compressors, 618 and 634, respectively.

Steps 705, 710, 715, and 720 are then continually repeated by the system 600 to provide load balancing.

The present embodiments of the invention provide a number of advantages. For example, by operating each compressor with a sufficient margin from the surge line, safe operation of all of the compressors is ensured. Furthermore, the present embodiments maximize the efficiency of the process by minimizing recycle flows for each of the compressors. In addition, the present embodiments maintain the operating points of all of the compressors at the same margin from the surge control line. Furthermore, the present embodiments determine the common CEF setpoint CEFSP as a function, in part, of the suction pressure PV. In addition, the present embodiments, decouple the surge and unit load sharing controllers thereby avoiding dynamic instabilities and ensuring smooth operation of the compressor trains under changing process conditions. Finally, the present embodiments, provide fully automatic operation and compressor load optimization by implementing an integrated load sharing methodology encompassing multiple compressor trains.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A method of controlling the operation of a first compressor having an inlet coupled to a suction line and an outlet coupled to a discharge line and a second compressor having an inlet coupled to the suction line and an outlet coupled to the discharge line, comprising:

coupling a pressure transducer to the suction line for generating a signal representative of an operating pressure within the suction line;

coupling a central controller to the first and second compressors and the pressure transducer for generating a signal representative of a common coefficient of export flow set point for the first and second compressors as a function of the signal representative of the operating pressure within the suction line;

coupling a first controller to the central controller for adjusting the operating point of the first compressor using the signal representative of the common coefficient of export flow set point; and coupling a second controller to the central controller for adjusting the operating point of the second compressor using the signal representative of the common coefficient of export flow set point.

2. The method of claim 1, further comprising:

determining an actual first coefficient of export flow for the first compressor that is equal to a net export flow for the first compressor divided by a surge control setpoint for the first compressor;

determining an actual second coefficient of export flow for the second compressor that is equal to a net export flow for the second compressor divided by a surge control setpoint for the second compressor; and determining the common coefficient of export flow set point for the first and second compressors as a function of the first and second actual coefficients of export flow.

3. The method of claim 2, wherein determining the common coefficient of export flow set point for the first and second compressors as a function of the first and second actual coefficients of export flow comprises:

determining which of the first and second actual coefficients of export flow have the highest value; and determining the common coefficient of export flow set point for the first and second compressors as a function of the highest value actual coefficient of export flow.

4. The method of claim 1, wherein adjusting the operating points of the first and second compressors using the common coefficient of export flow set point comprises:

adjusting the rotational speeds of the first and second compressors.

5. The method of claim 1, wherein adjusting the operating points of the first and second compressors using the common coefficient of export flow set point comprises:

adjusting the amount of fluid that may be provided to the inlets of the first and second compressors.

6. A system for controlling the operation of a first compressor having an inlet coupled to a suction line and an outlet coupled to a discharge line and a second compressor having an inlet coupled to the suction line and an outlet coupled to the discharge line, comprising:

pressure transducer means operably coupled to the suction line for generating a signal representative of an operating pressure within the suction line;

central controller means operably coupled to the first and second compressors and the pressure transducer means for generating a signal representative of a common coefficient of export flow set point for the first and second compressors as a function of the signal representative of the operating pressure within the suction line;

first controller means coupled to the central controller means for adjusting the operating point of the first compressor using the signal representative of the common coefficient of export flow set point; and second controller means coupled to the central controller means for:

adjusting the operating point of the second compressor using the signal representative of the common coefficient of export flow set point.

7. The system of claim 6, further comprising:

means for determining an actual first coefficient of export flow for the first compressor that is equal to a net export flow for the first compressor divided by a surge control setpoint for the first compressor;

means for determining an actual second coefficient of export flow for the second compressor that is equal to a net export flow for the second compressor divided by a surge control setpoint for the second compressor; and means for determining the common coefficient of export flow set point for the first and second compressors as a function of the first and second actual coefficients of export flow.

8. The system of claim 7, wherein means for determining the common coefficient of export flow set point for the first and second compressors as a function of the first and second actual coefficients of export flow comprises:

means for determining which of the first and second actual coefficients of export flow have the highest value; and means for determining the common coefficient of export flow set point for the first and second compressors as a function of the highest value actual coefficient of export flow.

9. The system of claim 6, wherein means for adjusting the operating points of the first and second compressors using the common coefficient of export flow set point comprises:

means for adjusting the rotational speeds of the first and second compressors.

10. The system of claim 6, wherein means for adjusting the operating points of the first and second compressors using the common coefficient of export flow set point comprises:

means for adjusting the amount of fluid that may be provided to the inlets of the first and second compressors.

11. A system for controlling the operation of a first compressor having an inlet coupled to a suction line and an outlet coupled to a discharge line and a second compressor having an inlet coupled to the suction line and an outlet coupled to the discharge line, comprising:

a pressure transducer operably coupled to the suction line for generating a signal representative of an operating pressure within the suction line;

a central controller operably coupled to the first and second compressors and the pressure transducer for generating a signal representative of a common coefficient of export flow set point for the first and second compressors as a function of the signal representative of the operating pressure within the suction line;

a first controller coupled to the central controller for adjusting the operating point of the first compressor using the signal representative of the common coefficient of export flow set point; and a second controller coupled to the central controller for adjusting the operating point of the second compressor using the signal representative of the common coefficient of export flow set point.

12. The system of claim 11, further comprising:

a first unit load sharing controller operably coupled to the first compressor and the central controller for generating a signal representative of an actual first coefficient of export flow for the first compressor that is equal to a net export flow for the first compressor divided by a surge control setpoint for the first compressor; and a second unit load sharing controller operably coupled to the second compressor and the central controller for generating a signal representative of an actual second coefficient of export flow for the second compressor that is equal to a net export flow for the second compressor divided by a surge control setpoint for the second compressor;

wherein the central controller is adapted to generate the signal representative of the common coefficient of export flow set point for the first and second compressors as a function of the signals representative of the first and second actual coefficients of export flow.

13. The system of claim 12, further comprising:

a high selector operably coupled to the first and second unit load sharing controllers and the central controller for processing the signals representative of the first and second actual coefficients of export flow to generate a high select signal representative of the signal representative of the first and second actual coefficients of export flow having the highest value;

wherein the central controller processes the high select signal to generate the signal representative of a common coefficient of export flow set point for the first and second compressors.

14. The system of claim 11, wherein the first controller is adapted to adjust the operating point of the first compressor using the signal representative of the common coefficient of export flow set point by adjusting the operating speed of the first compressor; and wherein the second controller is adapted to adjust the operating point of the second compressor using the signal representative of the common coefficient of export flow set point by adjusting the operating speed of the second compressor.

15. The system of claim 11, wherein the first controller is adapted to adjust the operating point of the first compressor using the signal representative of the common coefficient of export flow set point by adjusting the amount of fluid that may be drawn into the inlet of the first compressor; and wherein the second controller is adapted to adjust the operating point of the second compressor using the signal representative of the common coefficient of export flow set point by adjusting the amount of fluid that may be drawn into the inlet of the second compressor.

16. A control system for controlling the operation of a first compressor operably coupled to a first turbine and including an inlet coupled to a suction line and an outlet coupled to a discharge line and a second compressor operably coupled to a second turbine and including an inlet coupled to the suction line and an outlet coupled to the discharge line, comprising:

a first turbine controller operably coupled to the first turbine for controlling the operation of the first turbine and adapted to generate a signal representative of the actual rotational speed of the first turbine and receive a signal representative of a rotational speed setpoint for the first turbine;

a first flow element operably coupled to the inlet of the first compressor and adapted to generate a signal representative of the flow rate through the inlet of the first compressor;

first and second pressure transducers operably coupled to the inlet and the outlet of the first compressor, respectively, and adapted to generate signals representative of the operating pressures within the inlet and the outlet of the first compressor, respectively;

a first recycle valve operably coupled to the inlet and the outlet of the first compressor and adapted to controllably fluidicly couple the inlet and the outlet of the first compressor;

a first surge controller operably coupled to the first flow element, the first and second pressure transducers, and the first recycle valve and adapted to process the signals representative of the flow rate through the inlet of the first compressor, and the operating pressures within the inlet and the outlet of the first compressor and generate a signal for controlling the operation of the first recycle valve and a signal representative of the operating point of the first compressor;

a first unit load sharing controller operably coupled to the first turbine controller and the first surge controller and adapted to process the signal for controlling the operation of the first recycle valve, the signal representative of the operating point of the first compressor, the signal representative of the actual rotational speed of the first turbine, and a signal representative of a common coefficient of export flow set point and generate the signal representative of the rotational speed setpoint for the first turbine and a signal representative of an actual coefficient of export flow value for the first compressor;

a second turbine controller operably coupled to the second turbine for controlling the operation of the second turbine and adapted to generate a signal representative of the actual rotational speed of the second turbine and receive a signal representative of a rotational speed setpoint for the second turbine;

a second flow element operably coupled to the inlet of the second compressor and adapted to generate a signal representative of the flow rate through the inlet of the second compressor;

third and fourth pressure transducers operably coupled to the inlet and the outlet of the second compressor, respectively, and adapted to generate signals representative of the operating pressures within the inlet and the outlet of the second compressor, respectively;

a second recycle valve operably coupled to the inlet and the outlet of the second compressor and adapted to controllably fluidicly couple the inlet and the outlet of the second compressor;

a second surge controller operably coupled to the second flow element, the third and fourth pressure transducers, and the second recycle valve and adapted to process the signals representative of the flow rate through the inlet of the second compressor, and the operating pressures within the inlet and the outlet of the second compressor and generate a signal for controlling the operation of the second recycle valve and a signal representative of the operating point of the second compressor;

a second unit load sharing controller operably coupled to the second turbine controller and the second surge controller and adapted to process the signal for controlling the operation of the second recycle valve, the signal representative of the operating point of the second compressor, the signal representative of the actual rotational speed of the second turbine, and a signal representative of a common coefficient of export flow set point and generate the signal representative of the rotational speed setpoint for the second turbine and a signal representative of an actual coefficient of export flow value for the second compressor;

a high selector operably coupled to the first and second unit load sharing controllers and adapted to process the signals representative of the actual coefficients of export flow value for the first and second compressors and generate a high select signal representative of the highest value of the signals representative of the actual coefficients of export flow value for the first and second compressors;

a suction pressure transducer operably coupled to the suction line adapted to generate a signal representative of an operating pressure of the suction line; and a central controller operably coupled to the first and second unit load sharing controllers, the high selector, and the suction pressure transducer and adapted to process the high select signal, the signal representative of the operating pressure of the suction line, and a signal representative of a suction pressure set point and generate the signal representative of the common coefficient of export flow set point.

17. A control system for controlling the operation of a first compressor operably coupled to a first fixed speed motor and including an inlet coupled to a suction line and an outlet coupled to a discharge line and a second compressor operably coupled to a second fixed speed motor and including an inlet coupled to the suction line and an outlet coupled to the discharge line, comprising:

a suction throttle valve operably coupled between the inlet of the first compressor and the suction line for controllably fluidicly coupling the inlet of the first compressor to the suction line;

a first flow element operably coupled to the inlet of the first compressor and adapted to generate a signal representative of the flow rate through the inlet of the first compressor;

first and second pressure transducers operably coupled to the inlet and the outlet of the first compressor, respectively, and adapted to generate signals representative of the operating pressures within the inlet and the outlet of the first compressor, respectively;

a first recycle valve operably coupled to the inlet and the outlet of the first compressor and adapted to controllably fluidicly couple the inlet and the outlet of the first compressor;

a first surge controller operably coupled to the first flow element, the first and second pressure transducers, and the first recycle valve and adapted to process the signals representative of the flow rate through the inlet of the first compressor, and the operating pressures within the inlet and the outlet of the first compressor and generate a signal for controlling the operation of the first recycle valve and a signal representative of the operating point of the first compressor;

a first unit load sharing controller operably coupled to the first suction throttle valve and the first surge controller and adapted to process the signal for controlling the operation of the first recycle valve, the signal representative of the operating point of the first compressor, and a signal representative of a common coefficient of export flow set point and generate a signal for controlling the operation of the first suction throttle valve and a signal representative of an actual coefficient of export flow value for the first compressor;

a second suction throttle valve operably coupled between the inlet of the second compressor and the suction line for controllably fluidicly coupling the inlet of the second compressor to the suction line;

a second flow element operably coupled to the inlet of the second compressor and adapted to generate a signal representative of the flow rate through the inlet of the second compressor;

third and fourth pressure transducers operably coupled to the inlet and the outlet of the second compressor, respectively, and adapted to generate signals representative of the operating pressures within the inlet and the outlet of the second compressor, respectively;

a second recycle valve operably coupled to the inlet and the outlet of the second compressor and adapted to controllably fluidicly couple the inlet and the outlet of the second compressor;

a second surge controller operably coupled to the second flow element, the third and fourth pressure transducers, and the second recycle valve and adapted to process the signals representative of the flow rate through the inlet of the second compressor, and the operating pressures within the inlet and the outlet of the second compressor and generate a signal for controlling the operation of the second recycle valve and a signal representative of the operating point of the second compressor;

a second unit load sharing controller operably coupled to the second turbine controller and the second surge controller and adapted to process the signal for controlling the operation of the second recycle valve, the signal representative of the operating point of the second compressor, and a signal representative of a common coefficient of export flow set point and generate a signal for controlling the operation of the second suction throttle valve and a signal representative of an actual coefficient of export flow value for the second compressor;

a high selector operably coupled to the first and second unit load sharing controllers and adapted to process the signals representative of the actual coefficients of export flow value for the first and second compressors and generate a high select signal representative of the highest value of the signals representative of the actual coefficients of export flow value for the first and second compressors;

a suction pressure transducer operably coupled to the suction line adapted to generate a signal representative of an operating pressure of the suction line; and a central controller operably coupled to the first and second unit load sharing controllers, the high selector, and the suction pressure transducer and adapted to process the high select signal, the signal representative of the operating pressure of the suction line, and a signal representative of a suction pressure set point and generate the signal representative of the common coefficient of export flow set point.

18. A system for controlling the operation of a first compressor having an inlet coupled to a suction line and an outlet and a second compressor having an inlet coupled to the outlet of the first compressor and an outlet coupled to a discharge line, comprising:

a first pressure transducer coupled to the suction line for generating a signal representative of an operating pressure of the suction line;

a second pressure transducer coupled to the inlet of the second compressor for generating a signal representative of an operating pressure of the inlet of the second compressor;

first and second central controllers operably coupled to the first and second compressors and the first and second pressure transducers for generating signals representative of first and second coefficients of export flow set points for the first and second compressors as a function of the signals representative of the operating pressures of the suction line and inlet of the second compressor;

a first controller operably coupled to the first central controller for adjusting the operating point of the first compressor using the signal representative of the first coefficient of export flow set point; and a second controller operably coupled to the second central controller for adjusting the operating point of the second compressor using the signal representative of the second coefficient of export flow set point.

19. The system of claim 18, further comprising:
a first unit load sharing controller operably coupled to the first compressor and the first central controller for generating a signal representative of an actual first coefficient of export flow for the first compressor that is equal to the net export flow for the first compressor divided by the surge control setpoint for the first compressor; and
a second unit load sharing controller operably coupled to the second compressor and the second central controller for generating a signal representative of an actual second coefficient of export flow for the second compressor that is equal to the net export flow for the second compressor divided by the surge control setpoint for the second compressor;
wherein the first and second central controllers are adapted to generate the signals representative of first and second coefficients of export flow set points for the first and second compressors as a function of the signals representative of the first and second actual coefficients of export flow for the first and second compressors.

20. The system of claim 18, wherein
the first controller is adapted to adjust the operating point of the first compressor using the signal representative of the first coefficient of export flow set point by adjusting the operating speed of the first compressor; and wherein
the second controller is adapted to adjust the operating point of the second compressor using the signal representative of the second coefficient of export flow set point by adjusting the operating speed of the second compressor.

21. The system of claim 18, wherein
the first controller is adapted to adjust the operating point of the first compressor using the signal representative of the first coefficient of export flow set point by adjusting the amount of fluid that may be drawn into the inlet of the first compressor; and wherein
the second controller is adapted to adjust the operating point of the second compressor using the signal representative of the second coefficient of export flow set point by adjusting the amount of fluid that may be drawn into the inlet of the second compressor.

22. A control system for controlling the operation of a first compressor operably coupled to a first turbine and including an inlet coupled to a suction line and an outlet and a second compressor operably coupled to a second turbine and including an inlet coupled to the outlet of the first compressor and an outlet coupled to the discharge line, comprising:
a first turbine controller operably coupled to the first turbine for controlling the operation of the first turbine and adapted to generate a signal representative of the actual rotational speed of the first turbine and receive a signal representative of a rotational speed setpoint for the first turbine;
a first flow element operably coupled to the inlet of the first compressor and adapted to generate a signal representative of the flow rate through the inlet of the first compressor;
first and second pressure transducers operably coupled to the inlet and the outlet of the first compressor, respectively, and adapted to generate signals representative of the operating pressures within the inlet and the outlet of the first compressor, respectively;
a first recycle valve operably coupled to the inlet and the outlet of the first compressor and adapted to controllably fluidicly couple the inlet and the outlet of the first compressor;
a first surge controller operably coupled to the first flow element, the first and second pressure transducers, and the first recycle valve and adapted to process the signals representative of the flow rate through the inlet of the first compressor, and the operating pressures within the inlet and the outlet of the first compressor and generate a signal for controlling the operation of the first recycle valve and a signal representative of the operating point of the first compressor;
a first unit load sharing controller operably coupled to the first turbine controller and the first surge controller and adapted to process the signal for controlling the operation of the first recycle valve, the signal representative of the operating point of the first compressor, the signal representative of the actual rotational speed of the first turbine, and the signal representative of a coefficient of export flow set point for the first compressor and generate the signal representative of the rotational speed setpoint for the first turbine and a signal representative of an actual coefficient of export flow value for the first compressor;
a second turbine controller operably coupled to the second turbine for controlling the operation of the second turbine and adapted to generate a signal representative of the actual rotational speed of the second turbine and receive a signal representative of a rotational speed setpoint for the second turbine;
a second flow element operably coupled to the inlet of the second compressor and adapted to generate a signal representative of the flow rate through the inlet of the second compressor;
third and fourth pressure transducers operably coupled to the inlet and the outlet of the second compressor, respectively, and adapted to generate signals representative of the operating pressures within the inlet and the outlet of the second compressor, respectively;
a second recycle valve operably coupled to the inlet and the outlet of the second compressor and adapted to controllably fluidicly couple the inlet and the outlet of the second compressor;
a second surge controller operably coupled to the second flow element, the second pressure transducer, and the second recycle valve and adapted to process the signals representative of the flow rate through the inlet of the second compressor, and the operating pressures within the inlet and the outlet of the second compressor and generate a signal for controlling the operation of the second recycle valve and a signal representative of the operating point of the second compressor;
a second unit load sharing controller operably coupled to the second turbine controller and the second surge controller and adapted to process the signal for controlling the operation of the second recycle valve, the signal representative of the operating point of the second compressor, the signal representative of the actual rotational speed of the second turbine, and a signal representative of a coefficient of export flow set point for the second compressor and generate the signal representative of the rotational speed setpoint for the second turbine and a signal representative of an actual coefficient of export flow value for the second compressor;

first and second suction pressure transducers operably coupled to the suction line and the inlet of the second compressor adapted to generate signals representative of operating pressures of the suction line and the inlet of the second compressor;

a first central controller operably coupled to the first unit load sharing controller and the first suction pressure transducer and adapted to process the signal representative of the operating pressure of the suction line and a signal representative of a first suction pressure set point and generate the signal representative of the first coefficient of export flow set point; and a second central controller operably coupled to the second unit load sharing controller and the second suction pressure transducer and adapted to process the signal representative of the operating pressure of the inlet of the second compressor and a signal representative of a second suction pressure set point and generate the signal representative of the second coefficient of export flow set point.

* * * * *